United States Patent
Rhu et al.

(10) Patent No.: US 11,053,148 B2
(45) Date of Patent: Jul. 6, 2021

(54) DEVICE AND METHOD FOR SHORTCUT NITROGEN REMOVAL AND NITRITE-OXIDIZING BACTERIA ACTIVITY INHIBITION

(71) Applicant: BKT CO., LTD., Daejeon (KR)

(72) Inventors: Daehwan Rhu, Yeoju-si (KR); Minki Jung, Daejeon (KR); Dongjin Ju, Sejong (KR); Hongkeun Park, Mokpo-si (KR); Dongwoo Kim, Yoba Linda, CA (US); Hojae Hwang, Sejong (KR)

( * ) Notice: Subject to any disclaimer, the term of this patent is extended or adjusted under 35 U.S.C. 154(b) by 0 days.

(21) Appl. No.: 16/647,769

(22) PCT Filed: Jul. 24, 2018

(86) PCT No.: PCT/KR2018/008372
§ 371 (c)(1),
(2) Date: Mar. 16, 2020

(87) PCT Pub. No.: WO2019/066230
PCT Pub. Date: Apr. 4, 2019

(65) Prior Publication Data
US 2020/0231478 A1 Jul. 23, 2020

(30) Foreign Application Priority Data
Sep. 30, 2017 (KR) .................. 10-2017-0128467
Apr. 12, 2018 (KR) .................. 10-2018-0042446

(51) Int. Cl.
C02F 3/20 (2006.01)
C02F 3/00 (2006.01)
(Continued)

(52) U.S. Cl.
CPC .............. *C02F 3/201* (2013.01); *C02F 3/006* (2013.01); *C02F 3/303* (2013.01); *C02F 3/307* (2013.01);
(Continued)

(58) Field of Classification Search
CPC .......... C02F 3/201; C02F 3/006; C02F 3/303; C02F 3/307; C02F 2101/16;
(Continued)

(56) References Cited

U.S. PATENT DOCUMENTS 4,181,604 A 1/1980 Onishi et al.
6,361,695 B1 * 3/2002 Husain .................. C02F 1/444
210/614
(Continued)

FOREIGN PATENT DOCUMENTS

JP 2003-2456841 9/2003
JP 5592677 9/2014
(Continued)

OTHER PUBLICATIONS

English specification of 2003-245684.
(Continued)

*Primary Examiner* — Fred Prince
(74) *Attorney, Agent, or Firm* — Antonio Ha & U.S. Patent, LLC

(57) ABSTRACT

A device and method for shortcut nitrogen removal and nitrite-oxidizing bacteria activity inhibition are disclosed herein. An embodiment of the present invention provides a yarn fiber diffuser comprising: a plurality of yarn fibers on which bacteria can be attached and grow; and an inlet capable of supplying gas to one sides of the plurality of yarn fibers, wherein the gas includes oxygen and carbon dioxide,
(Continued)

nitrite can be produced by the oxygen, and the concentration of oxygen in the gas is adjusted by the oxygen and the carbon dioxide.

7 Claims, 13 Drawing Sheets

(51) Int. Cl.
    *C02F 3/30* (2006.01)
    *C02F 101/16* (2006.01)
(52) U.S. Cl.
    CPC ...... *C02F 2101/16* (2013.01); *C02F 2209/14* (2013.01); *C02F 2209/38* (2013.01); *C02F 2209/40* (2013.01)
(58) Field of Classification Search
    CPC .............. C02F 2209/14; C02F 2209/38; C02F 2209/40; C02F 3/102; C02F 3/208; C02F 3/12; C02F 3/20; C02F 3/30; C02F 3/34; Y02W 10/10
    USPC .......... 210/620, 220, 221.1, 221.2, 903, 614
    See application file for complete search history.

(56) References Cited

U.S. PATENT DOCUMENTS

| | | | |
|---|---|---|---|
| 8,394,273 B2* | 3/2013 | Rittmann | C02F 3/102 210/615 |
| 8,932,849 B2 | 1/2015 | Scherson et al. | |
| 2007/0007214 A1* | 1/2007 | Zha | B01D 63/02 210/718 |
| 2013/0020257 A1 | 1/2013 | McCarty | |
| 2014/0069863 A1 | 3/2014 | Wett et al. | |
| 2017/0015572 A1 | 1/2017 | Casey et al. | |

FOREIGN PATENT DOCUMENTS

| | | |
|---|---|---|
| KR | 10-0558628 | 3/2006 |
| KR | 10-2007-0057866 | 6/2007 |
| KR | 10-0953069 | 4/2010 |
| KR | 10-2015-0046555 | 4/2015 |
| KR | 10-2016-0008502 | 1/2016 |
| KR | 10-1869069 | 6/2018 |
| WO | WO2012116404 | 9/2012 |
| WO | 2016-209235 | 12/2016 |

OTHER PUBLICATIONS

Guangjing Xu, et al., Parititial nitrification adjusted by hydroxylamine in aerobic granules under high DO and ambient temperature and subsequent Anammox for low C/N wastewater treatment. Chemical Engineering Journal. 2012, vol. 213, pp. 338-345.
I.Zekker et al., Ameliorating nitrite inhibition in a low-temperature nitritation-anammox MBBR using bacterial intermediate nitric oxide. Int.J.Environ.Sci.Technol. 2017, vol. 14, pp. 2343-2356.
English Specification of 10-0558628.
English Specification of 10-2007-0057866.
English Specification of 10-2015-0046555.
English Specification of 10-2016-0008502.
English Specification of 5592677.
English Specification of 10-0953069.
English Specification of 10-1869069.
Yu-Jou Feng et al: "Aerated membrane-attached biofilm reactor as an effective tool for partial nitrification in pretreatment of anaerobic ammonium oxidation (ANAMMOX) process", Journal of Chemical Technology Ano Biotechnology Wiley, vol. 83, No. 1, Jan. 1, 2008 (Jan. 1, 2008), pp. 6-11 , XP001596083, ISSN: 0268-2575, 001: 10.1 002/JCTB.1731 [retrieved on Oct. 15, 2007].
Guangjing Xu et al: "Partial nitrification adjusted by hydroxylamine in aerobic granules under high 00 and ambient temperature and subsequent Anammox for low C/N wastewater treatment", Chemical Engeenring Journal, vol. 213, Oct. 27, 2012 (Oct. 27, 2012), pp. 338-345, XP055744387, Amsteroam. NL 1385-8947, 001: 10.1 016/j.cej.2012.1 0.014.
Suneethi S et al: "ANAMMOX process start up and stabilization with an anaerobic seed in Anaerobic Membrane Bioreactor (AnMBR)", Bioresource Technology, Elsevier, AI\ASTEROAM, NL, vol. 102, No. 19, Jun. 24, 2011 (Jun. 24, 2011), pp. 8860-8867, XP028276282, ISSN: 0960-8524, 001: 10.1 016/J.Biortech.2011.06.082 [retrieved on Jun. 30, 2011].

* cited by examiner (a)      (b)

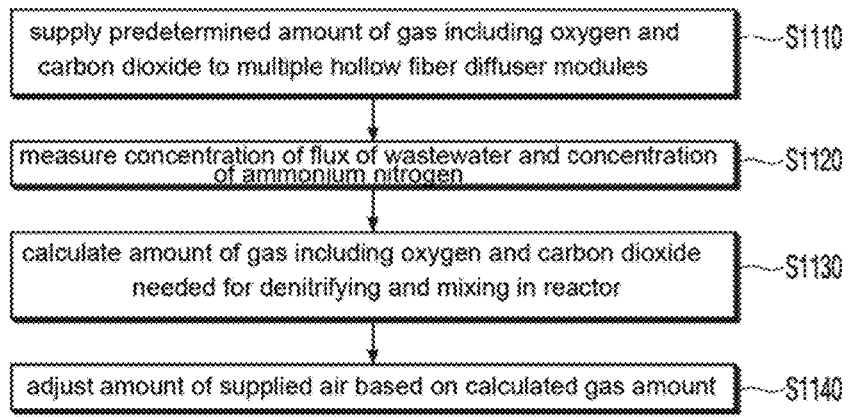
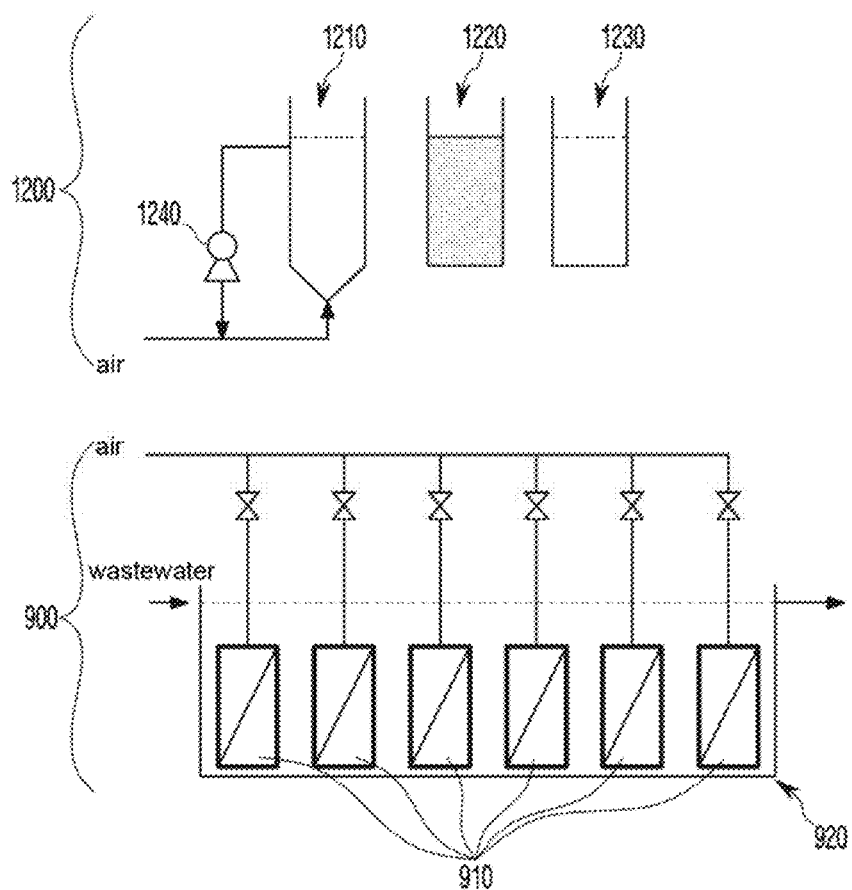

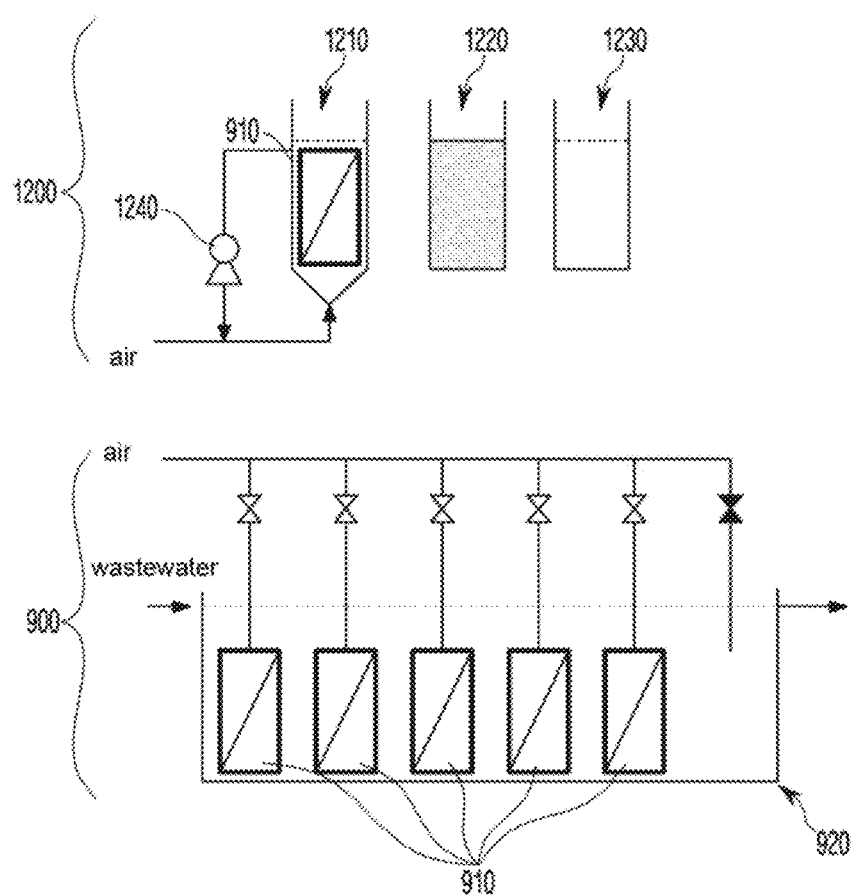

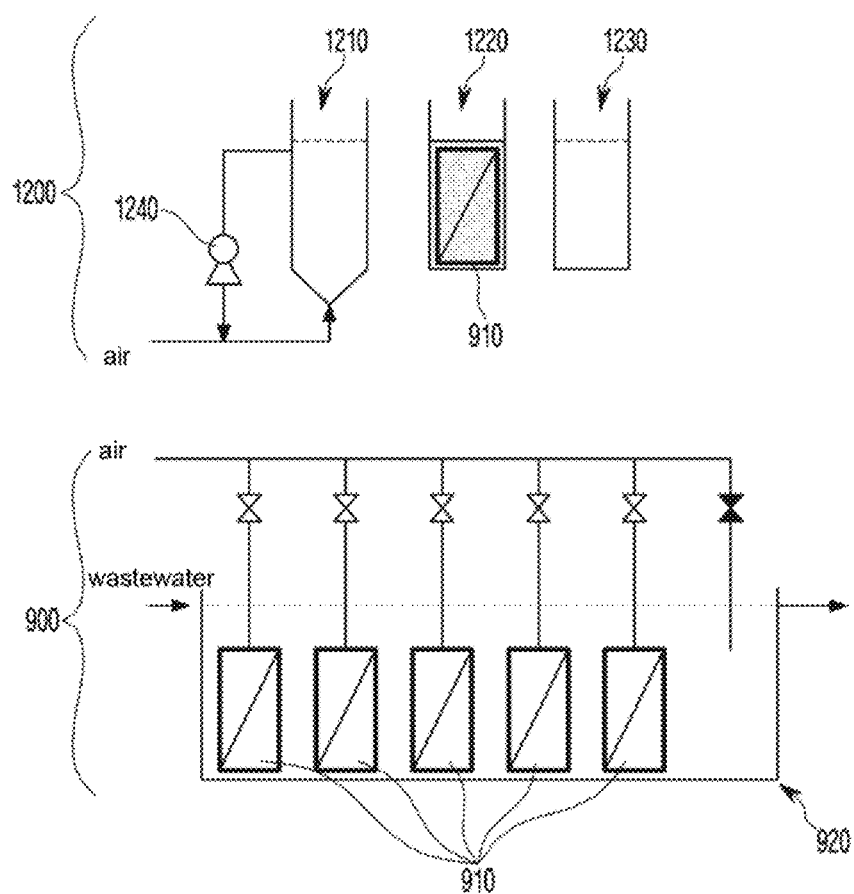

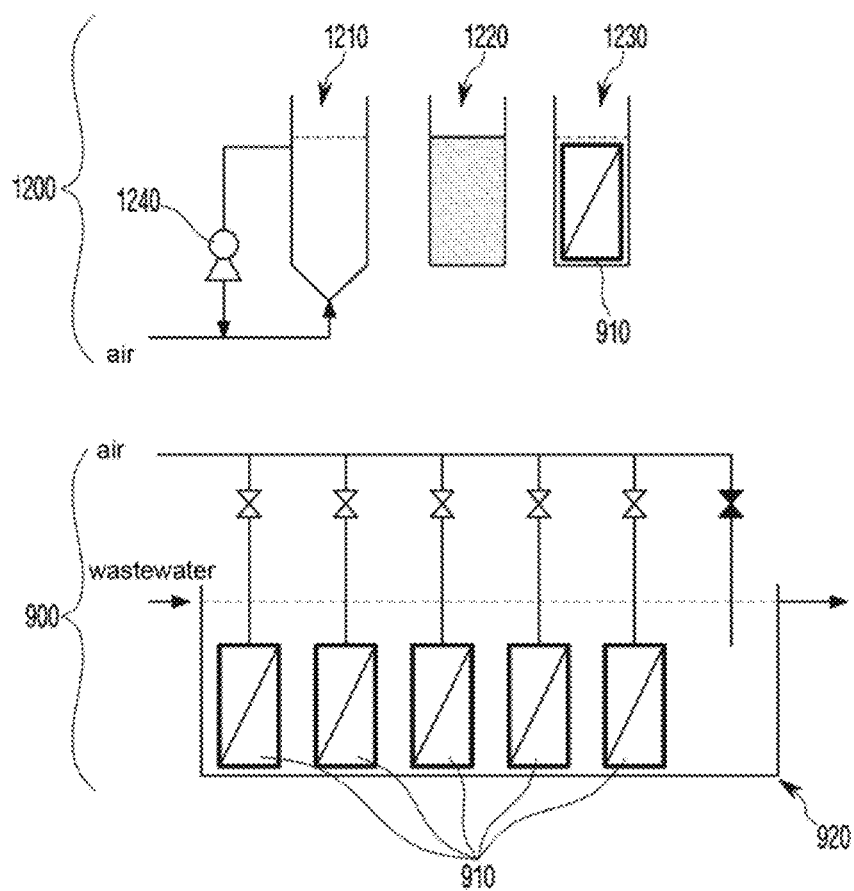

Fig. 17
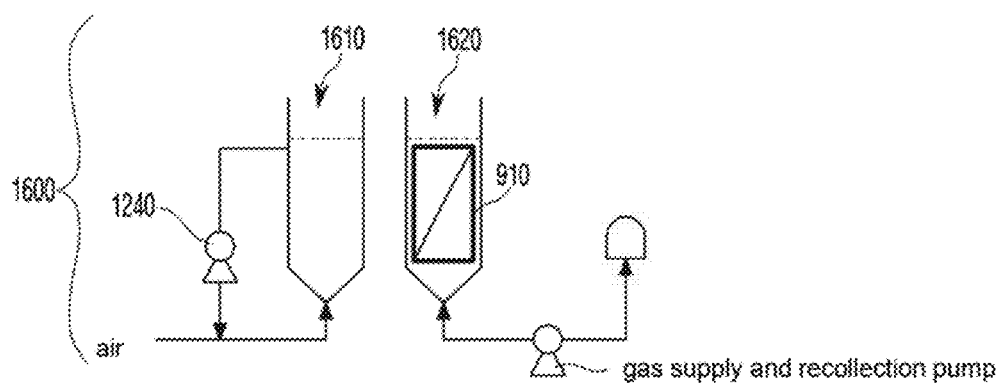
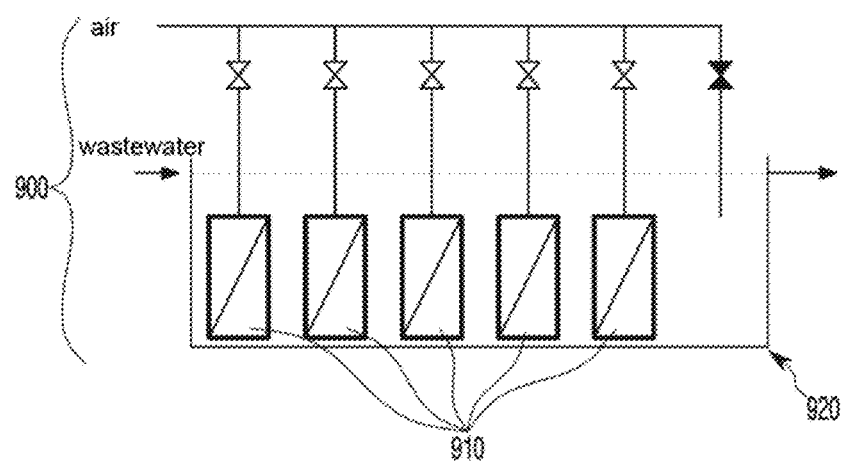

DEVICE AND METHOD FOR SHORTCUT NITROGEN REMOVAL AND NITRITE-OXIDIZING BACTERIA ACTIVITY INHIBITION

TECHNICAL FIELD

The embodiments relate to a device and method for suppressing the NOB from nitrite nitrogen oxidation by applying a diffuser module-used shortcut nitrogen remover and method to a nitrite-oxidizing bacteria activity inhibitor.

BACKGROUND ART

The description of the Discussion of Related Art section merely provides information that may be relevant to embodiments of the disclosure but should not be appreciated as necessarily constituting the prior art.

Contaminants in sewage and wastewater include solids, organic materials, and nitrogen and phosphor or other nutrient salts. Such contaminants may be removed by physical, chemical, or biological methods. Among others, biological active sludge treatment which get rids of contaminants using bacteria is highly economical and efficient and is thus in wide use on site.

To biologically oxidize organic materials and nitrogen, oxygen needs to be supplied as electron acceptor. Generally, oxygen exists as a gas. Thus, transfer of oxygen is needed for use by microorganisms. The transfer rate (r), in a liquid, of a less soluble gas, such as oxygen, is calculated as follows.

$$r = K_L(C_s - C_t)$$

$C_s$: concentration of gaseous oxygen (saturated oxygen concentration)

$C_t$: concentration of liquid oxygen (dissolved oxygen concentration)

The per-unit volume oxygen transfer rate ($r_v$) is obtained by multiplying r by area (A) followed by dividing the result by volume (V).

$$r_v = K_L \frac{A}{V}(C_s - C_t) = K_L a(C_s - C_t) \quad \text{[Equation 1]}$$

In the above equation, $K_L a$ is experimentally obtained and, in this case, fresh water is typically used.

The amount of oxygen transferred as needed in the biological process is influenced by various factors. The factors affecting such oxygen transfer capacity include the concentration of solids in wastewater, salinity, surface tension, temperature, altitude, depth of injection, degree of mixture in reactor, and shape of reactor. Thus, there is a significant difference between the amount of oxygen needed to oxidize contaminants and the amount of oxygen actually injected. Feeding oxygen requires supply of gases containing oxygen, e.g., the air. The amount of air actually needs to be fed is calculated as follows:

$$\text{standard oxygen demand } (SOR) = \frac{AOR \times C_{sw} \times \gamma}{\alpha \times 1.024^{(T-20)} \times (\beta C_s \times \gamma - C)} \times \frac{760}{P} \quad \text{[Equation 2]}$$

wherein,

AOR: net oxygen demand needed for biological reaction (kgO$_2$/d)

$C_s$: saturated oxygen concentration at T° C. (mg/L)
$C_{SW}$: saturated oxygen concentration at 20° C. (mg/L)
α: $K_L a$ correction coefficient
β: saturated oxygen concentration correction coefficient
γ: $C_s$ correction coefficient according to diffuser depth
T: temperature of reactor (° C.)
P: atmospheric pressure (mmHg)

$$\text{air (gas) supply (m}^3\text{/min)} = \frac{SOR}{OTE \times \rho \times O_W \times t} \times \frac{273+T}{273} \quad \text{[Equation 3]}$$

wherein,

OTE: oxygen transfer rate (%) in fresh water
ρ: air (gas) density (kg/Nm$^3$)
$O_w$: specific gravity of oxygen in air (gas) (kgO$_2$/kg$_{Air}$)
t: aeration time (min/d)

As shown in the above equation, the amount of oxygen needs to be supplied is affected by various characteristics of wastewater itself and the concentration of gas and liquid oxygen. The amount of gas actually supplied by a blower to supply oxygen needed for a biological reaction may rely on the oxygen transfer efficiency (OTE). Generally, the OTE of the diffuser currently in use ranges from 10% to 40%. In other words, if a diffuser with high OTE is used, a smaller amount of air (gas) may be supplied in the same oxygen demand. This may reduce the capacity of the blower for supplying the air (gas) and hence save power for operating the blower.

Resultantly, the amount of air (gas) supplied may be said to be determined by the OTE of the diffuser and the difference in concentration between gaseous oxygen and liquid oxygen except for the wastewater's own characteristics. For those reasons, there are ongoing research efforts to develop high-OTE diffusers. However, even the best ones exhibit an efficiency ranging from 10% to 40% with respect to fresh water. This means that 60% to 90% of the fed oxygen are exhausted to the air without being used.

Meanwhile, wastewater from homes or businesses contains ammonia, ammonium compounds, nitrite compounds, nitrate compounds, or other inorganic nitrogen or amino acids, proteins, or other organic nitrogen.

Nitrogen-containing wastewater may cause eutrophication and dissolved oxygen deficiency which may deteriorate water quality, and thus, its discharge to public water areas is being regulated based on predetermined standards. Wastewater treatment particularly on nitrogen wastewater is primarily performed in large-scale businesses or wastewater treatment facilities.

Most of the nitrogen components in wastewater exist as ammonium nitrogen. Thus, conventional treatment focuses primarily on a combination of nitrification/denitrification.

A method advanced from the nitrification/denitrification combination is to oxidize only a half of ammoniacal nitrogen through to the nitritation (NO$_2^-$) step and then remove nitrogen using the remaining ammonium nitrogen as electron donor. This method includes shortcut nitrogen removal using ANAMMOX microorganisms that form nitrogen gas.

The ANAMMOX reaction is a method of converting ammonium nitrogen into nitrogen gas using nitrite nitrogen as electron acceptor under an anaerobic (or semi-anaerobic) condition by action of specific microorganisms and this is represented as follows:

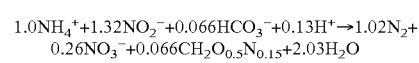

As shown in the above formula, ANAMMOX treatment requires nitrite nitrogen which is the electron acceptor. For such reasons, the conventional shortcut nitrogen removal processes require that partial nitritation for oxidizing a half of ammonium nitrogen into nitrite nitrogen be combined at the front stage of the ANAMMOX process. Further, since reaction is performed in each reactor, the overall volume of the device for removing nitrogen may be increased, and other various issues may arise.

Recently, there has been developed the technology to enable the partial nitritation and ANAMMOX reactions to be simultaneously performed in a single reactor so as to reduce the site area. However, this technology requires fine adjustment of air supply, and overly injected air may render it difficult to form an anaerobic (or semi-anaerobic) condition that is needed for the ANAMMOX.

Various methods are used to remove nitrogen that causes eutrophication in wastewater. Among others, biological nitrification/denitrification (or nitrogen removal process) is uses most frequently for economic reasons. However, such biological nitrification/denitrification may consume massive energy and too much of the carbon source.

In the biological nitrification-denitrification process, when 1 kg of ammonium nitrogen is oxidized, 4.57 kg of oxygen and 7.14 kg of alkalinity are consumed and, when 1 kg of nitrate nitrogen is denitrified, 4 kg to 5 kg of carbon source is consumed. Further, if 1 kg of nitrogen is removed upon nitrification/denitrification, 4 kWh to 5 kWh of power and 13 dollars to 17 dollars are used.

Thus, to save energy and carbon source, nitritation-denitritation is used. When 1 kg of ammoniacal nitrogen is oxidized, 3.42 kg of oxygen is consumed and, upon denitrification, 2.86 kg of carbon source is consumed. Thus, nitritation-denitritation may advantageously save 25% of oxygen and 40% of carbon source as compared with nitrification-denitrification.

The partial nitritation-ANAMMOX (anaerobic ammonium oxidation) process that surges in use may save 60% of oxygen and 100% of carbon source as compared with nitrification-denitrification. However, this process requires 1.9 kg of oxygen to remove 1 kg of ammonium nitrogen.

Meanwhile, oxygen needed for oxidation of nitrogen is supplied from the diffuser. Thus, use of a high-OTE diffuser is of utmost importance to save the energy needed for supplying oxygen. Various types of diffusers are under development. Due to the low solubility of oxygen gas, conventional diffusers do not surpass 40% of OTE in fresh water and 20% of OTE in wastewater treatment.

To address this, membrane aerated biofilm reactors (MABRs) and membrane biofilm reactors (MBfRs) have been developed which use a membrane as diffuser. In the MABR, the membrane plays a role as a diffuser. Microorganisms may be attached to the membrane and be grown and cultivated so that the OTE reaches nearly 100%. If such an MABR process is adopted for partial nitritation-ANAMMOX, the air demand merely amounts to 8% of that in the conventional processes.

Nitrification proceeds in two steps as follows:

first-step (Ammonia Oxidation): $NH_4^+ + 1.5O_2 \rightarrow NO_2^- + 2H^+ + H_2O$ second-step (Nitrite Oxidation): $NO_2^- + 0.5O_2 \rightarrow NO_3^-$ The first-step ammonia oxidation is performed by ammonium oxidation bacteria (AOB), and the second-step nitrite oxidation is performed by nitrite oxidation bacteria (NOB).

In the partial nitritation-ANAMMOX process, the ANAMMOX (or anaerobic ammonium oxidation) reaction proceeds as follows:

$1.0NH_4^+ + 1.32NO_2^- + 0.066HCO_3^- + 0.13H^+ \rightarrow 1.02N_2 + 0.26NO_3^- + 0.066CH_2O_{0.5}N_{0.15} + 2.03H_2O$ The ANAMMOX reaction needs to be preceded by partial nitritation that converts part of ammonium nitrogen into nitrite nitrogen.

Thus, it is critical to stop nitrogen oxidation in the middle of nitritation. If nitrite nitrogen ($NO_2$—N) is oxidized into nitrate nitrogen ($NO_3$—N), no ANAMMOX reaction occurs. Thus, success or failure in the ANAMMOX reaction may be said to rely on accumulating nitrite nitrogen by stopping nitrite nitrogen.

To achieve the foregoing objective, such an environment needs to be prepared where the AOB may easily survive, but the NOB don't, and thus the AOB are dominant. To that end, various factors, such as solid retention time (SRT), dissolved oxygen (DO), free ammonia (FA), free nitrous acid (FNA), and temperature, may apply. In particular, to form an environment where the AOB are dominant, the FA, FNA, and temperature may apply. However, such factors are applicable if the concentration and pH of ammonium nitrogen remain high as in the side stream produced in the anaerobic process, but not in handling sewage low in the concentration and pH of ammonium nitrogen.

Meanwhile, to nitritate sewage, the SRT and DO may be used. However, due to similarity between the respective specific growth rates of the AOB and NOB are similar, the on-site application of the SRT may be impracticable. Thus, the DO is the only controllable factor.

However, it is difficult to make conditions advantageous to the AOB by controlling the DO concentration for nitritation in the MABR process. In the MABR, microorganisms build up outside of the membrane. If oxygen necessary for reaction is supplied inside the membrane, a great amount of oxygen is supplied to microorganisms near the membrane while oxygens supply to microorganisms outside of the membrane is restricted. That is, at the biofilm where the AOB and the NOB are mixed and grown together, only a difference in the concentration of DO may be made depending on whether they are near the membrane, but it is technically impossible to supply oxygen only to the AOB while cutting off oxygen supply to the NOB. Thus, it is very difficult to attain stable nitritation using the MABR despite high OTE.

DETAILED DESCRIPTION OF THE INVENTION

Technical Problem

An object of the embodiments is to provide a device and method for shortcut nitrogen removal and nitrite oxidation bacteria activity inhibition to save the amount of air blow needed for oxygen supply by providing a diffuser and diffuser module capable of raising the efficiency of transfer of oxygen to microorganisms.

The embodiments aim to provide a device and method for shortcut nitrogen removal and nitrite-oxidizing bacteria activity inhibition, in which to apply a diffuser module in a shortcut nitrogen removing process and remove nitrogen from wastewater using a shortcut nitrogen removal reaction, the amount of oxygen needed for the process and the amount of gas needed for mixture in the reactor are adjusted to be the same by properly mixing the air, oxygen, and carbon dioxide so that the supplied oxygen is 100% used, and mixture may be performed only with the supplied gas to thereby save operation costs while maintaining a higher reaction velocity in the overall reactor.

The instant embodiments aim to provide a device and method for shortcut nitrogen removal and nitrite-oxidizing bacteria activity inhibition, in which to perform leaching appropriate for adjusting the SRT of bacteria growing on the surface of the diffuser module, the amount of gas needed may be adjusted to be two to three times larger than the amount of gas needed for mixture, so that the flux for leaching is increased using carbon dioxide to prevent an increase in the amount of oxygen supplied to the inside of the reactor, and the anaerobic and semi-anaerobic conditions needed for shortcut nitrogen removal may be stably secured.

The instant embodiments aim to provide a device and method for shortcut nitrogen removal and nitrite-oxidizing bacteria activity inhibition, which suppress the activity of nitrite-oxidizing bacteria (NOB) while maintaining the activity of the ammonia-oxidizing bacteria (AOB) in the membrane aerated biofilm reactor (MABR).

The instant embodiments aim to provide a device and method for shortcut nitrogen removal and nitrite-oxidizing bacteria activity inhibition, which inhibit the activity of nitrite-oxidizing bacteria (NOB) by immersing a membrane diffuser in a separate tank filled with a nitrite oxidation suppressant for a predetermined time.

Further, the instant embodiments aim to provide a device and method for shortcut nitrogen removal and nitrite-oxidizing bacteria activity inhibition, in which a solid leaching tank, an inhibition tank, and a washing tank are provided, excessive bacteria and solids are leached in the solid leaching tank to prevent the inhibition tank from being contaminated with solids, the concentration and retention time of suppressant filling the inhibition tank are adjusted to optimize the suppression effect, and in the washing tank, the remaining suppressant is washed out so as to minimize the discharge of the toxic suppressant, along with the processed water.

Technical Solution

According to an embodiment, a hollow fiber diffuser comprises a plurality of hollow fiber threads where bacteria may stick and grow and an inlet part for supplying gas on a side of the plurality of hollow fiber threads, wherein the gas includes oxygen and carbon dioxide, wherein nitrous acid may be produced by the oxygen, and wherein a concentration of the oxygen in the gas is adjusted by the oxygen and the carbon dioxide.

According to an embodiment, a hollow fiber diffuser module for shortcut nitrogen removal comprises at least one or more hollow fiber diffusers, wherein the hollow fiber diffuser includes a plurality of hollow fiber threads where bacteria may stick and grow and an inlet part for supplying gas on a side of the plurality of fiber threads, wherein the gas includes oxygen and carbon dioxide, wherein nitrous acid may be produced by the oxygen, and wherein a concentration of the oxygen in the gas is adjusted by the oxygen and the carbon dioxide.

According to an embodiment, the hollow fiber diffusers include a plurality of hollow fiber diffusers, wherein the plurality of hollow fiber diffusers are spaced apart from each other in predetermined gaps, and wherein predetermined spaces are formed between the plurality of hollow fiber diffusers.

According to an embodiment, the bacteria stuck to the hollow fiber diffusers include nitrite bacteria, and ANAMMOX bacteria are included in the predetermined spaces.

According to an embodiment, the ANAMMOX bacteria are stuck to media positioned in the predetermined gaps.

According to an embodiment, the hollow fiber diffuser module is positioned in a reactor for a shortcut nitrogen removal process, and wherein the supplied gas includes a mixture of oxygen necessary for the shortcut nitrogen removal process and a gas necessary for mixture in the reactor.

According to an embodiment, a shortcut nitrogen remover comprises a measuring unit measuring, at least, a flux of wastewater introduced and a concentration of ammonium nitrogen, a reactor removing nitrogen from the introduced wastewater, a plurality of hollow fiber diffuser modules positioned in the reactor, an air supplier supplying gas to the plurality of hollow fiber diffuser modules, the gas including air, oxygen, and carbon dioxide, and a controller adjusting an amount of the air, oxygen, or carbon dioxide of the gas.

According to an embodiment, the hollow fiber diffuser modules include a plurality of hollow fiber diffusers where nitrite bacteria producing nitrous acid stick and grow and ANAMMOX bacteria positioned in predetermined spaces between the plurality of hollow fiber diffusers.

According to an embodiment, the shortcut nitrogen remover further comprises media positioned in the predetermined spaces, wherein the media include the ANAMMOX bacteria.

According to an embodiment, a volume of the gas including the oxygen and the carbon dioxide is controlled to be identical to a volume of gas needed for mixture in the reactor.

According to an embodiment, a shortcut nitrogen removing process using a reactor where a plurality of hollow fiber diffuser modules are positioned comprises supplying a predetermined amount of gas including oxygen and carbon dioxide to the plurality of hollow fiber diffuser modules, measuring, at least, a flux of wastewater and a concentration of ammonium nitrogen, calculating an amount of the gas including the carbon dioxide and oxygen needed for mixture in the reactor and nitritation, and adjusting the amount of the gas based on the calculated amount Advantageous Effects As set forth above, according to an embodiment, the hollow fiber diffuser module is applied which simultaneously performs creation of a biofilm of nitrite bacteria and supply of oxygen. Thus, the supplied oxygen may be 100% used and, thus, the energy of air blow needed for supplying oxygen may be significantly saved.

According to an embodiment, air, oxygen, and carbon dioxide are mixed together so that the amount of gas for supplying oxygen needed for nitritation is adjusted to be the same as the amount of gas needed for mixture. Thus, without separate manipulation, proper mixture may be performed so that the removal of contaminants in the reactor may remain at high speed.

According to an embodiment, bacteria is leached by increasing the supply of gas, thereby securing a proper SRT for allowing the nitrite bacteria (or ammonium oxidizing bacteria) to be dominant. The amount of gas needed to maintain the concentration of dissolved oxygen (DO) may be secured by increasing carbon dioxide. Without increasing the amount of oxygen, the biofilm may be leached efficiently. Thus, the concentration of dissolved oxygen (DO) in the reactor does not increase, and the anaerobic state may be maintained all the time. Thus, the shortcut nitrogen removal reaction may remain stable.

According to an embodiment, the nitrite-oxidizing bacteria activity inhibitor and method are used to suppress the activity of nitrite-oxidizing bacteria (NOB) while maintaining the activity of the ammonia-oxidizing bacteria (AOB) in the membrane aerated biofilm reactor (MABR) process to thereby maximize the oxygen transfer efficiency (OTE). Thus, the power consumed for supplying air may be reduced to less than 10% of the conventional process.

According to an embodiment, the nitrite-oxidizing bacteria (NOB) suppressing system is applied which immerses the membrane diffuser in a separate tank filled with the nitrite oxidation suppressant for a predetermined time. Thus, it is possible to selectively inhibit only the activity of nitrite-oxidizing bacteria (NOB).

According to an embodiment, a solid leaching tank, an inhibition tank, and a washing tank are provided, excessive bacteria and solids are leached in the solid leaching tank to prevent the inhibition tank from being contaminated with solids, the concentration and retention time of suppressant filling the inhibition tank are adjusted to optimize the suppression effect, and in the washing tank, the remaining suppressant is washed out so as to minimize the discharge of the toxic suppressant, along with the processed water. Thus, the nitrite-oxidizing bacteria (NOB) may be allowed to stably take dominance.

Further, according to an embodiment, when $NO_2$ and $NH_4$ are used as suppressant, they are reused for partial nitritation-ANAMMOX process to adjust the $NO_2$ to $NH_4$ ratio, thereby saving maintenance costs.

BRIEF DESCRIPTION OF DRAWINGS

FIG. 11 is a flowchart illustrating a process of shortcut nitrogen removal according to an embodiment of the present invention;

FIG. 12 is a view illustrating an activity inhibitor of nitrite-oxidizing bacteria (NOB) according to the first embodiment of the present invention;

FIG. 13 is a view illustrating a process in which a membrane diffuser unit is immersed in a leaching tank of a nitrite-oxidizing bacteria (NOB) activity inhibitor, according to the first embodiment of the present invention;

FIG. 14 is a view illustrating a process in which a membrane diffuser unit where solid leaching has been complete is immersed in an inhibition reaction tank filled with a nitrite-oxidizing bacteria (NOB) suppressant according to the first embodiment of the present invention;

FIG. 15 is a view illustrating a process in which a membrane diffuser unit where suppression reaction has been complete is moved to and immersed in a washing tank according to the first embodiment of the present invention;

FIG. 17 is a view illustrating a process in which a membrane diffuser unit is immersed in an inhibition reaction tank when NO gas is used as suppressant according to the second embodiment of the present invention;

BEST MODE TO PRACTICE THE INVENTION

Hereinafter, embodiments of the present invention are described in detail with reference to the accompanying drawings. The same or substantially the same reference denotations are used to refer to the same or substantially the same elements throughout the specification and the drawings. When determined to make the subject matter of the present invention unclear, the detailed description of the known configurations or functions may be skipped.

Such denotations as "first," "second," "A," "B," "(a)," and "(b)," may be used in describing the components of the present invention. These denotations are provided merely to distinguish a component from another, and the essence of the components is not limited by the denotations in light of order or sequence. When an element "includes" another element, the element may further include the other element, rather excluding the other element, unless particularly stated otherwise. Further, the term " . . . unit" or "module" as used herein denote a unit processing at least one function or operation and be implemented in hardware, software, or a combination thereof.

Figure 1:
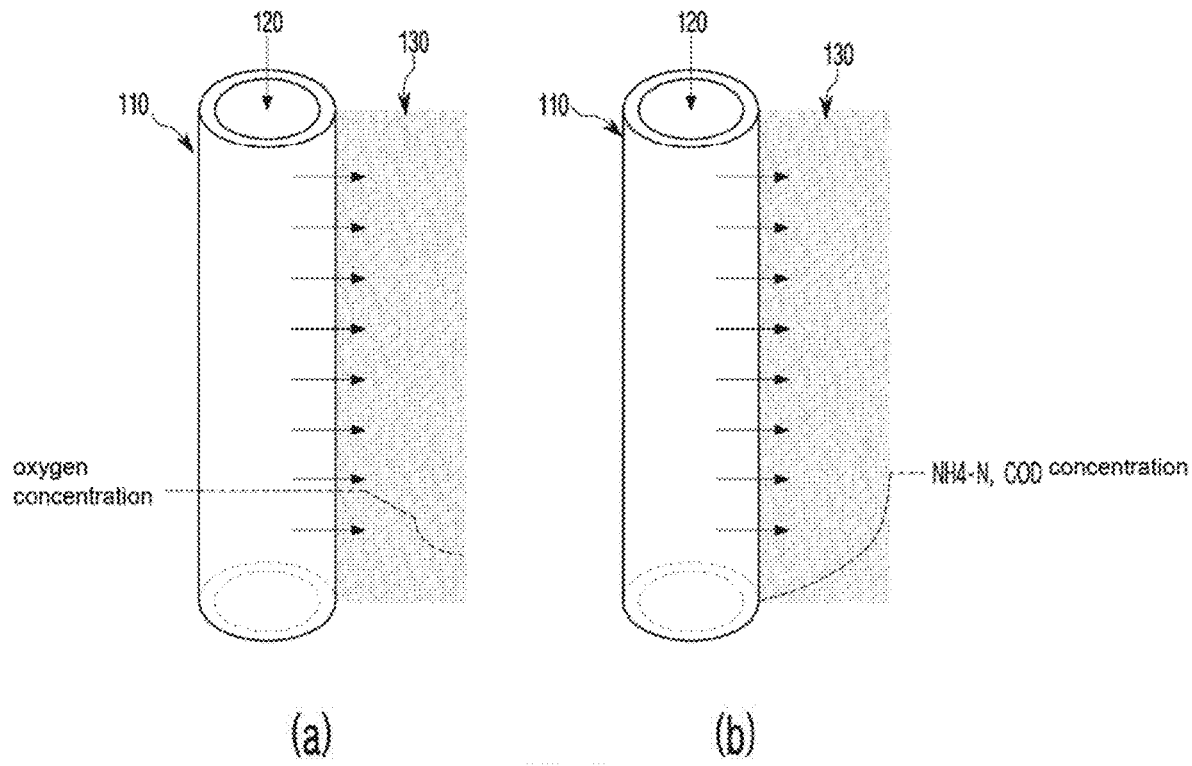
FIG. 1 is a view illustrating a conventional membrane used as diffuser and media.

FIG. 1 is a view illustrating a conventional membrane used as diffuser and media.

A membrane 110 is a hollow fiber membrane developed to separate solids from liquids. The membrane 110 may be used as a diffuser to supply air 120 to a reactor. As shown in FIG. 1, the membrane 110 supplies the air 120 through pores in the membrane 110 to the thereinside. The membrane 110 remains immersed in the reactor, and aerobic bacteria stick and grow on the surface thereof.

Thus, the oxygen contained in the air 120 supplied to the inside of the membrane 110 may be directly supplied to the bacteria on the membrane surface, thus raising the oxygen transfer efficiency (OTE). The bacteria oxidize organic materials and ammonia, which are spread from the liquid of the reactor to the inside of a biofilm 130, using the supplied oxygen.

Figure 2:
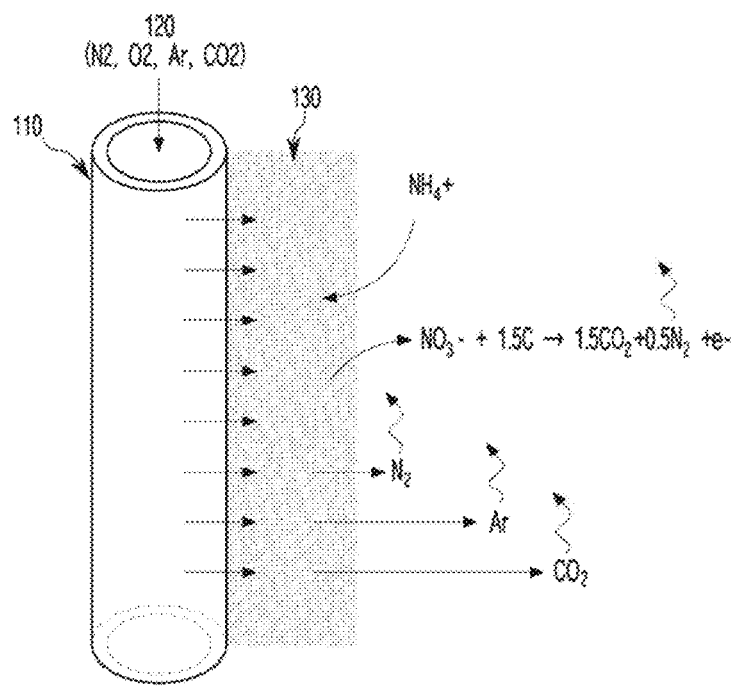
FIG. 2 is a view illustrating a process in which nitrogen is removed from wastewater in a conventional membrane diffuser.

FIG. 2 is a view illustrating a process in which nitrogen is removed from wastewater in a conventional membrane diffuser.

The nitrite-oxidizing bacteria (NOB) (or nitrifier) sticking and growing on the membrane surface oxidize the ammonium nitrogen transferred from the liquid to produce nitrate nitrogen. The produced nitrate nitrogen is transferred to the liquid, reduces into nitrogen gas while oxidizing the organic materials by the denitrifying bacteria, and is then discharged to the air. Use of the diffuser using the membrane 110 enables nitrification and denitrification to be simultaneously performed in a single reactor and allows the oxygen transfer efficiency to reach nearly 100%, thus significantly saving the amount of air blow necessary for supplying oxygen.

Meanwhile, the reason for supplying the air (gas) to the reactor is to achieve both the goal for supplying oxygen necessary for oxidizing contaminants and the goal for mixture in the reactor. It is known that it is ok to typically supply 1 $m^3$/hr of air (gas) per one $m^3$ to achieve the mixture in reactor. The amount of air (gas) supplied to the bio reactor in common wastewater treatment is larger than the amount necessary for mixture. For this reason, typically the amount of gas for mixture is not separately considered. This may be shown in FIG. 3.

Figure 3:
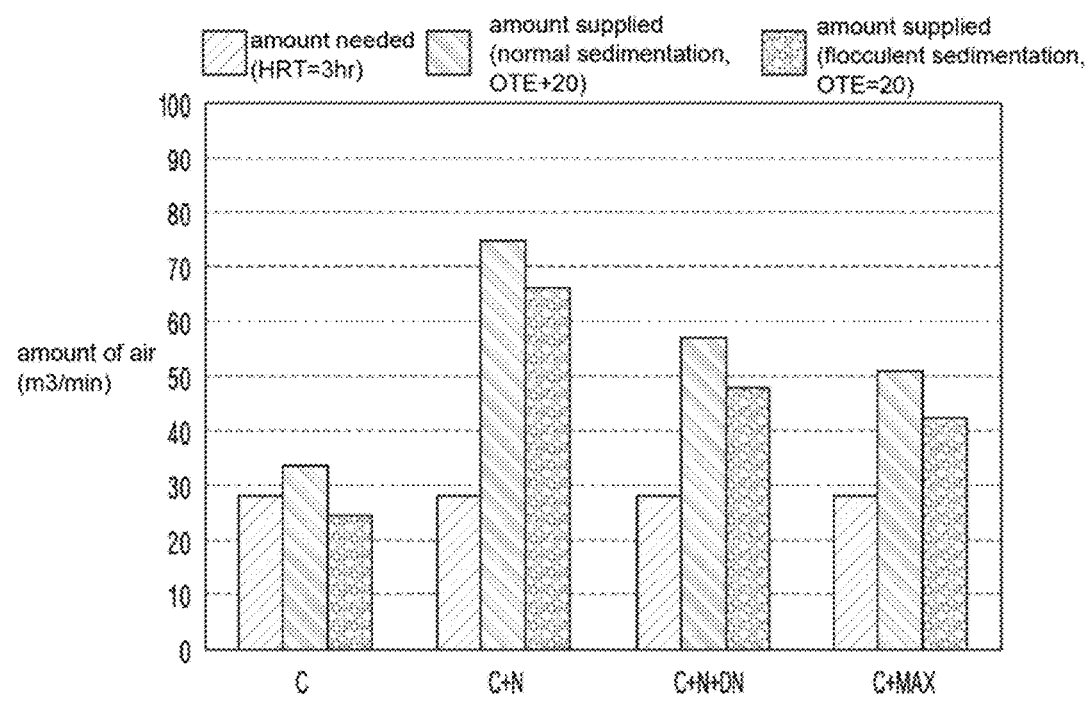
FIG. 3 is a view illustrating graphs of the amount of air supplied for oxygen supply and the amount of air needed for mixture in a reactor when the oxygen transfer efficiency is 20%.

FIG. 3 is a view illustrating graphs of the amount of air supplied for oxygen supply and the amount of air needed for mixture in a reactor when the oxygen transfer efficiency is 20%.

FIG. 3 shows comparison between the amount of air necessary for mixture and the amount of air for actually treating contaminants in the case where the aeration tank retention time in the treatment station with the capacity of 10,000 tons/day is three hours (OTE=20%). It can be shown from FIG. 3 that under most conditions, the amount of air (gas) supplied for supplying oxygen is larger than the amount of air necessary for mixture in reactor (C: organics removal, C+N: organics removal+nitrogen oxidation, C+N+DN: organics removal+nitrogen oxidation+denitritation, C+AMX: organics removal+shortcut nitrogen removal). Thus, if the amount of air (gas) for supplying oxygen is larger than the amount of air necessary for mixture in reactor, no separate stirrer for mixture in reactor is needed. However, the situation is changed if the oxygen transfer efficiency increases as shown in FIG. 4.

Figure 4:
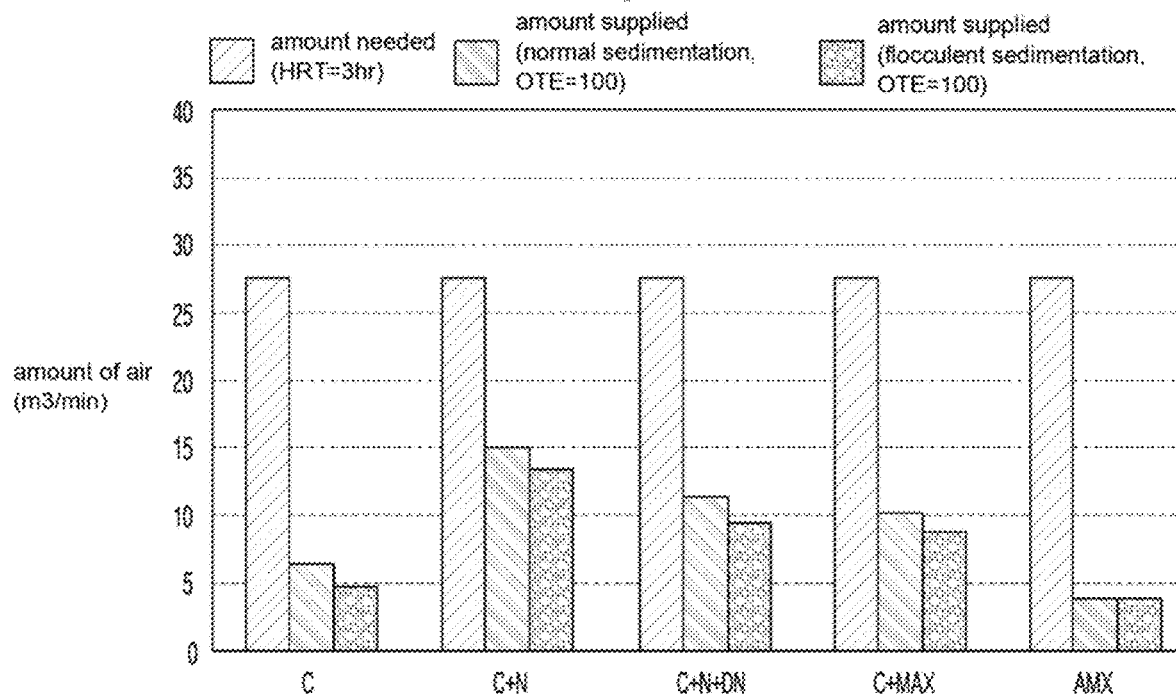
FIG. 4 is a view illustrating graphs of the amount of air supplied for oxygen supply and the amount of air needed for mixture in a reactor when the oxygen transfer efficiency is 100%.

FIG. 4 is a view illustrating graphs of the amount of air supplied for oxygen supply and the amount of air needed for mixture in a reactor when the oxygen transfer efficiency is 100%.

It may be shown from the graph that under all of the conditions, the amount of air supplied is smaller than the amount of air necessary for mixture.

Mixture is a critical factor in reaction engineering. If mixture is not properly performed, a concentration gradient occurs, slowing down the reaction. This may be shown from FIGS. 5 and 6.

Figure 5:
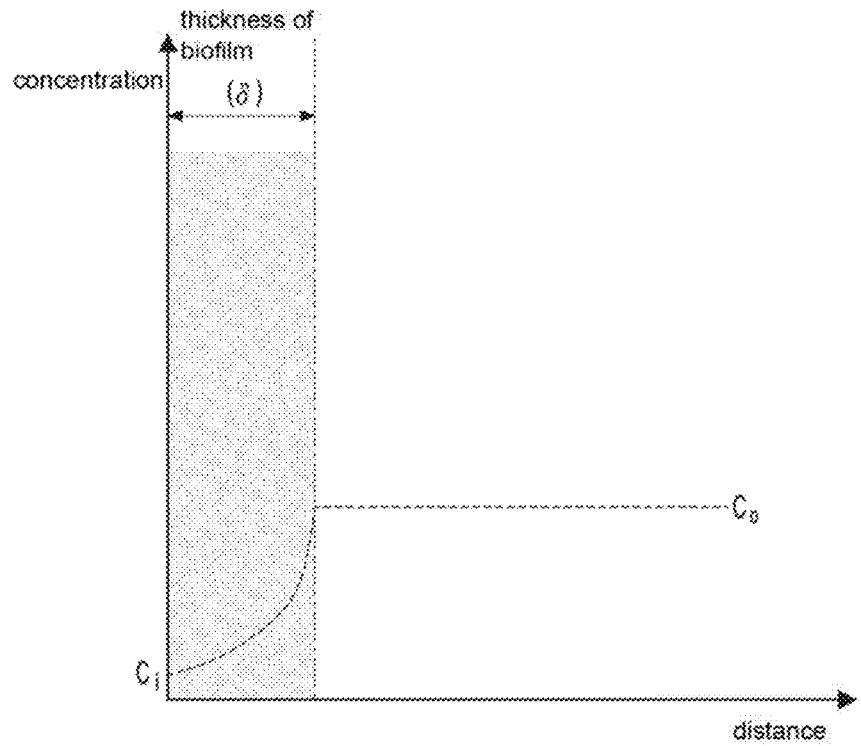
FIG. 5 is a graph illustrating variations in the concentration of a material transferred to a biofilm when the mixture of liquids is sufficient.
Figure 6:
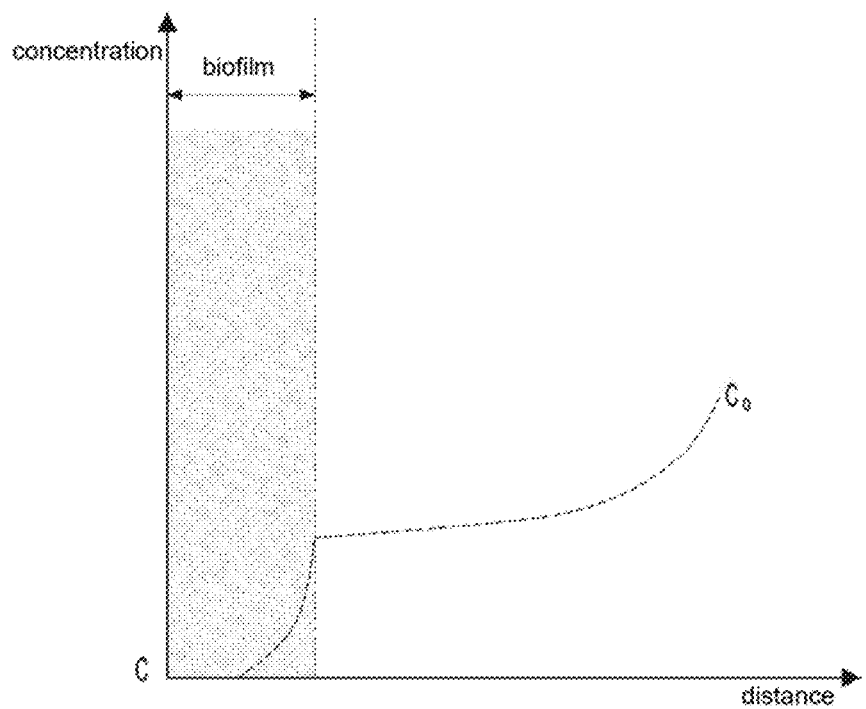
FIG. 6 is a graph illustrating variations in the concentration of a material transferred to a biofilm when the mixture of liquids is insufficient.

FIG. 5 is a graph illustrating variations in the concentration of the materials transferred to the bio film when the liquids are sufficiently mixed, and FIG. 6 is a graph illustrating variations in the concentration of materials transferred to the bio film when the liquid mixture is insufficient.

As shown in FIG. 5, if the mixture is properly done, concentration (Co) in the liquid is maintained so that the materials are transferred to the whole bio film 130. However, as shown in FIG. 6, if the liquid mixture is insufficient, the concentration is lowered depending on the distance in the liquid, and the materials may not be transferred to the inside of the bio film 130.

Thus, if the membrane 110 is used as diffuser so that the oxygen transfer efficiency rises up to 100%, the energy necessary for air blow may be saved. However, as the energy necessary for liquid mixture is insufficient, efficient mixture is not done and, resultantly, the contaminant removal efficiency may be lowered. In particular, if the membrane 110 is used as diffuser, and the oxygen transfer efficiency rises up to 100%, the amount of air supplied is absolutely insufficient as compared with the amount of air necessary for mixture and, thus, the reaction speed may be significantly lowered as in the case of shortcut nitrogen removal (AMX) shown in FIG. 4. Thus, the membrane diffuser module adopting the conventional membrane 110 as diffuser may take a very long time to cultivate bacteria in the anaerobic environment.

To address such issue, separate air injection for mixture or installation of a mixer for additional mechanical mixture is required. However, if the air is injected, oxygen is supplied together with the air and may negatively affect bacteria cultivation, e.g., causing toxins to the ANAMMOX bacteria that require an anaerobic or semi-anaerobic condition. If mechanical mixture is additionally performed, the shear force for mixture may not be transferred to the inside due to the nature of the module in which the film is densely integrated.

According to an embodiment of the present invention, there is proposed a way to forcedly remove contaminants, e.g., nitrogen, from wastewater using a membrane diffuser that plays a role both as a diffuser for supplying oxygen and as media where bacteria stick and grown.

Figure 7:
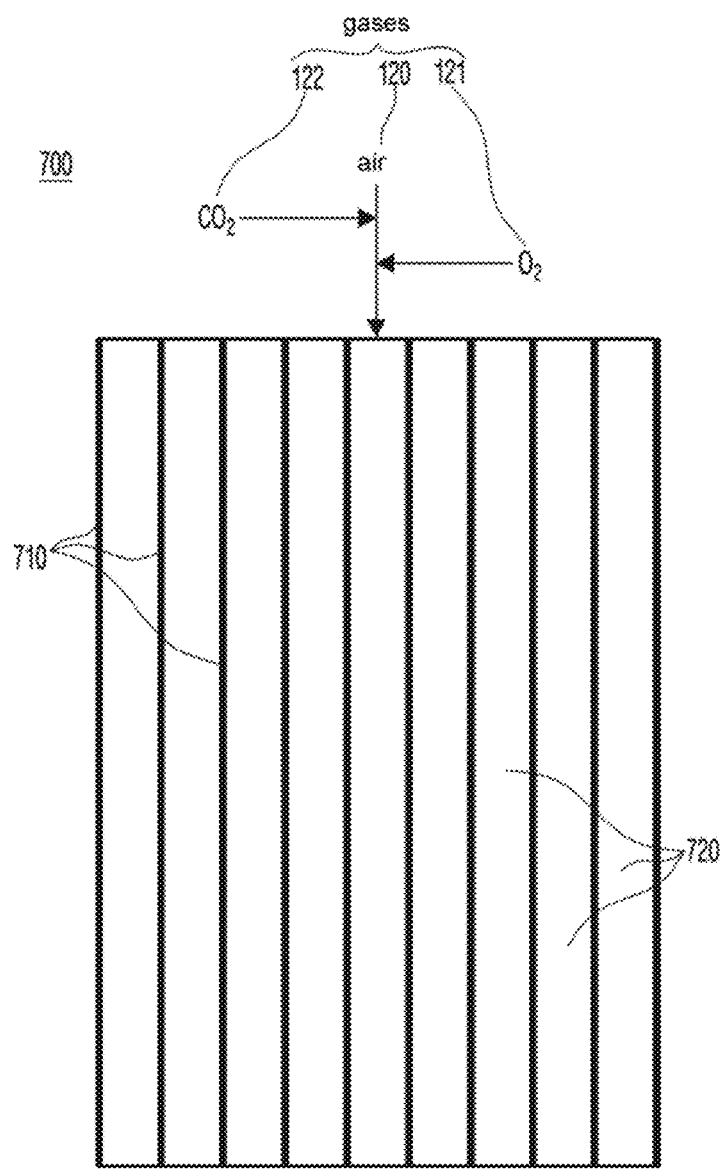
FIG. 7 is a view illustrating a configuration of a membrane diffuser module according to a first embodiment of the present invention.
Figure 8:
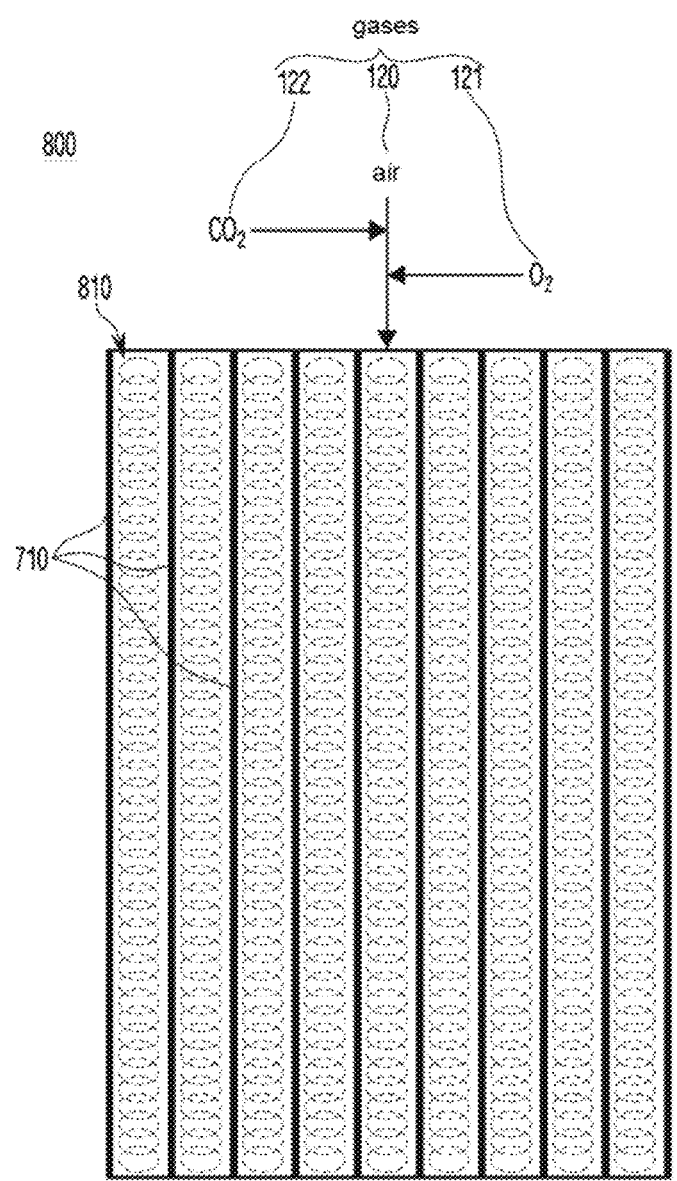
FIG. 8 is a view illustrating a configuration of a membrane diffuser module according to a second embodiment of the present invention.

FIG. 7 is a view illustrating a configuration of a membrane diffuser module according to the first embodiment of the present invention. FIG. 8 is a view illustrating a configuration of a membrane diffuser module according to the second embodiment of the present invention.

Referring to FIG. 7, a membrane diffuser module 700 includes a plurality of membrane diffusers 710 and spaces 720 between the plurality of membrane diffusers 710. The membrane diffusers 710 may be configured of a plurality of fiber threads (not shown), but without limitation thereto, may include an inlet part (not shown) for allowing for supply of gas. The gas may be supplied simultaneously or individually to the plurality of membrane diffusers 710.

The gas is supplied by a blower (not shown) and includes air 120 including nitrogen (not shown) and oxygen 121. Further, as necessary, the gas may include oxygen 121 or carbon dioxide 122 in addition to the air 120. The membrane diffusers 710 supply the gas necessary for removing contaminants to the membrane diffuser module 700. The amount of each component of the gas may be adjusted.

The membrane diffuser module 700 adjusts the amount of each of the air 120, oxygen 121, or carbon dioxide 122 supplied so that the amount of the gas supplied is identical to the sum of the amount needed for supplying oxygen and the amount needed for mixture in reactor. In some cases, the membrane diffuser module 700 may prevent excessive supply of the gas, particularly oxygen 121, by adjusting the amount of each of the air 120, oxygen 121, or carbon dioxide 122 supplied. The membrane diffuser module 700 compares the amount of oxygen 121 included in the air 120 in the provided gas with the amount needed for supplying oxygen to trigger oxidation.

First, there may be an occasion in which the amount of oxygen 121 included in the air in the provided gas (hereinafter, simply referred to as 'provided oxygen amount') is larger than the amount needed for supplying oxygen to trigger oxidation (hereinafter, simply referred to as 'amount necessary for oxygen supply'). In such a case, too much oxygen 121 is present in the reactor and there is a high chance of failure in forming an anaerobic environment. Thus, the membrane diffuser module 700 reduces the amount of gas supplied. At this time, since the supplied gas is used for mixture in reactor as well as for supplying oxygen 121, the reduction in the amount of supplied gas may result in failure in proper mixture in the reactor although an anaerobic environment may be formed in the reactor. Thus, the membrane diffuser module 700 determines whether the amount of supplied gas less the amount needed for oxygen supply is sufficient for mixture in reactor. If the amount of supplied gas less the amount needed for oxygen supply is sufficient for mixture in reactor, the membrane diffuser module 700 reduces the amount of supplied gas until the provided oxygen (121) amount becomes identical to the amount needed for oxygen supply. In contrast, unless the amount of supplied gas less the amount needed for oxygen supply is sufficient for mixture in reactor, the membrane diffuser module 700 additionally injects as much carbon dioxide 122 as sufficient for mixture in reactor. If the additional air 120 is injected, the oxygen 121 in the air 120 obstructs the creation of an anaerobic environment. Thus, the membrane diffuser module 700 may additionally inject more carbon dioxide 122.

On the contrary, if the provided oxygen (121) amount is insufficient as compared with the amount needed for oxygen supply, the membrane diffuser module 700 additionally injects oxygen 121. Without the need for operating a blower for supplying the additional air 120, the membrane diffuser module 700 may directly inject only the oxygen 121, which is needed, as much as needed, ensuring creation of an anaerobic environment along with as much injection as needed.

The oxygen 121 included in the supplied gas moves through the pores in the membrane diffusers 710 from the inside to outside while being fed to the bacteria growing on the surface. Since the amount of oxygen 121 in the supplied air is limited, an aerobic environment may be created only around the membrane diffusers 710, and the bacteria are stuck and grown on the membrane diffusers 710. The bacteria growing on the surface are microorganisms that oxidize specific elements using oxygen and include ammonia-oxidizing bacteria (AOB) that convert ammonia or ammonium ions into nitrite nitrogen and nitrite-oxidizing bacteria (NOB) that convert nitrite nitrogen into nitrate nitrogen. The ammonia-oxidizing bacteria (AOB) has about twice as higher oxygen affinity as the nitrite-oxidizing bacteria (NOB). Thus, if the dissolved oxygen (DO) is high, the ammonia-oxidizing bacteria (AOB) and the nitrite-oxidizing bacteria (NOB) both have high activity and, thus, oxidation of ammonia or ammonium ions and oxidation of nitrite nitrogen may be actively performed. However, if the dissolved oxygen (DO) is low, the ammonia-oxidizing bacteria (AOB) which have relatively high oxygen affinity have high activity while the nitrite-oxidizing bacteria (NOB) have low activity. In other words, if oxygen supply is limited, the ammonia-oxidizing bacteria (AOB) may take dominance where bacteria grow. Thus, oxidation of ammonia or ammonium ions actively proceeds, allowing nitrite ions to accumulate. The membrane diffuser module 710 may control the dominance of bacteria growing on the diffusers 710 by adjusting the amount of supplied air 120, specifically the amount of supplied oxygen 121, thus controlling the elements accumulated.

Meanwhile, the ANAMMOX bacteria which convert ammonia and nitrite nitrogen into nitrogen gas grow in the inter-membrane diffuser spaces 720. The ANAMMOX bacteria may grow in suspended state or on separate media 810 placed in the spaces 720 for ANAMMOX bacteria. The ANAMMOX bacteria are microorganisms that convert ammoniacal nitrogen into nitrogen gas using nitrite nitrogen, an electron acceptor, in an anaerobic (or semi-anaerobic) environment. As set forth above, since the aerobic environment is created only around the membrane diffusers 710, the anaerobic environment is formed in the spaces between the membrane diffusers 710. Thus, bacteria cultivated in the anaerobic environment, as are ANAMMOX bacteria, may be optimally cultivated even without the need for a separate, additional environment. If the media 810 are installed, 90% or more of the bacteria stick to and grow on the media 810, and the bacteria may grow while forming a biofilm.

The gas supplied to the membrane diffusers 810 includes the air 120, oxygen 121, and carbon dioxide 122, and the components are mixed and supplied or, in some context, additional supply may be performed for a needed component. The amount of the supplied gas may be adjusted to meet both the amount needed to remove contaminants and the amount needed for mixture in reactor and then be supplied.

As described above, according to an embodiment of the present invention, the bacteria cultivator 700 may supply the oxygen 121 to meet the condition where nearly 100% of the oxygen 121 may be used while meeting the amount of gas for mixture in reactor. Thus, the membrane diffuser module 700 may provide the gas in the optimal quantity without the need for excessively increasing the amount of gas, thus saving operation costs and leaving the overall reactor at high reaction speed. Further, the membrane diffuser module 700 does not reuse the remaining oxygen passing through the membrane diffuser module 700 and may thus be made in a smaller size.

Figure 9:
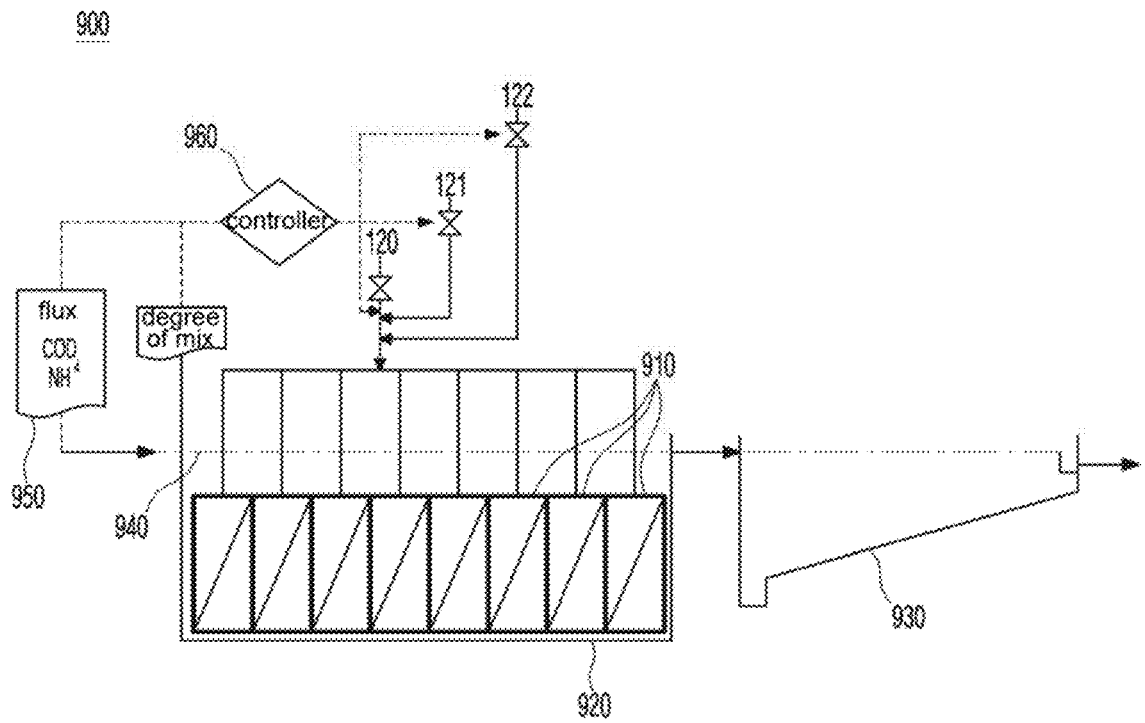
FIG. 9 is a view illustrating a shortcut nitrogen remover adopting a membrane diffuser module according to an embodiment of the present invention.

FIG. 9 is a view illustrating a shortcut nitrogen remover adopting a membrane diffuser module according to an embodiment of the present invention.

A shortcut nitrogen remover 900 removes nitrogen by adjusting the components in the gas using a membrane diffuser unit 910. An incoming wastewater measuring unit 950 of the shortcut nitrogen remover 900 measures the flux, organic materials, and ammoniacal nitrogen of incoming wastewater 940 and calculates the amount of gas supplied to the inside of the reactor 920. Since the amount of gas needed for mixture in the reactor 920 is typically 1 m$^3$/hr per reactor volume, a controller 960 calculates the amount of gas needed for mixture in the reactor 920 from the volume of the reactor 920. The controller 960 calculates the amount of gas needed for mixture in the reactor 920 considering a safety rate of 10% to 30% and the amount of gas calculated using the volume of the reactor 920.

The controller 960 also calculates the amount of oxygen needed for biological reaction. First, the controller 960 determines whether the amount of oxygen 121 included in the supplied gas meets the amount of oxygen needed for a biological reaction. Since the membrane diffuser (not shown) has an oxygen transfer efficiency (OTE) of 100%, the controller 960 performs the above-described determination using calculation of the amount of air 120 supplied. In contrast, the conventional membrane diffuser is required to consider its unique oxygen transfer efficiency (OTE) upon calculating the amount of supplied air 120, and the oxygen transfer efficiency (OTE) has variables, e.g., time or environment. Thus, due to too many factors to be considered, calculation is too difficult and, if carried out, it takes too long.

As set forth above, if the amount of oxygen in the supplied gas meets the amount of oxygen needed for biological reaction, the controller 960 determines whether the amount of supplied gas except for the oxygen 121 is larger than the amount of gas needed for mixture in reactor. If the amount of supplied gas except for the oxygen 121 is larger than the amount needed for mixture in reactor, the controller 960 reduces the supply of gas within the limit meeting the oxygen amount condition. In contrast, if the amount of supplied gas except for the oxygen 121 is smaller than the amount needed for mixture in reactor, the controller 960 increases the supply of carbon dioxide 122 to allow for supply of the gas sufficient for mixture in reactor.

If the amount of the oxygen 121 included in the supplied air fails to meet the amount of oxygen needed for biological reaction, the controller 960 performs control to allow only pure oxygen 121 to be supplied.

Thus, the controller 960 enables smooth biological reaction and mixture in reactor, along with supply of as much gas as needed, rather than too much gas.

The incoming wastewater measuring unit 950 measures, in real-time, the flux of wastewater and the concentration of ammoniacal nitrogen, allowing the controller 960 to calculate the amount of gas needed for nitritation.

Meanwhile, the shortcut nitrogen remover 900 has high oxygen transfer efficiency (OTE) but may not selectively supply the oxygen 121 only to the ammonia-oxidizing bacteria (AOB) while cutting off the supply of oxygen 121 to the nitrite-oxidizing bacteria (NOB) so as to suppress nitrite oxidation in the bio film where the ammonia-oxidizing bacteria (AOB) and the nitrite-oxidizing bacteria (NOB) are mixed and grown. Thus, the shortcut nitrogen remover 900 may have a separate device to prevent the nitrite-oxidizing bacteria (NOB) from oxidizing nitrite nitrogen. This device may suppress nitrite oxidation in the bio reactor 920, allowing for stable removal of nitrogen in subsequent anaerobic ammonium oxidation (ANAMMOX). A device and method for suppressing nitrite oxidation by inhibiting the activity of nitrite-oxidizing bacteria are described in detail with reference to FIGS. 12 to 19.

Figure 10:
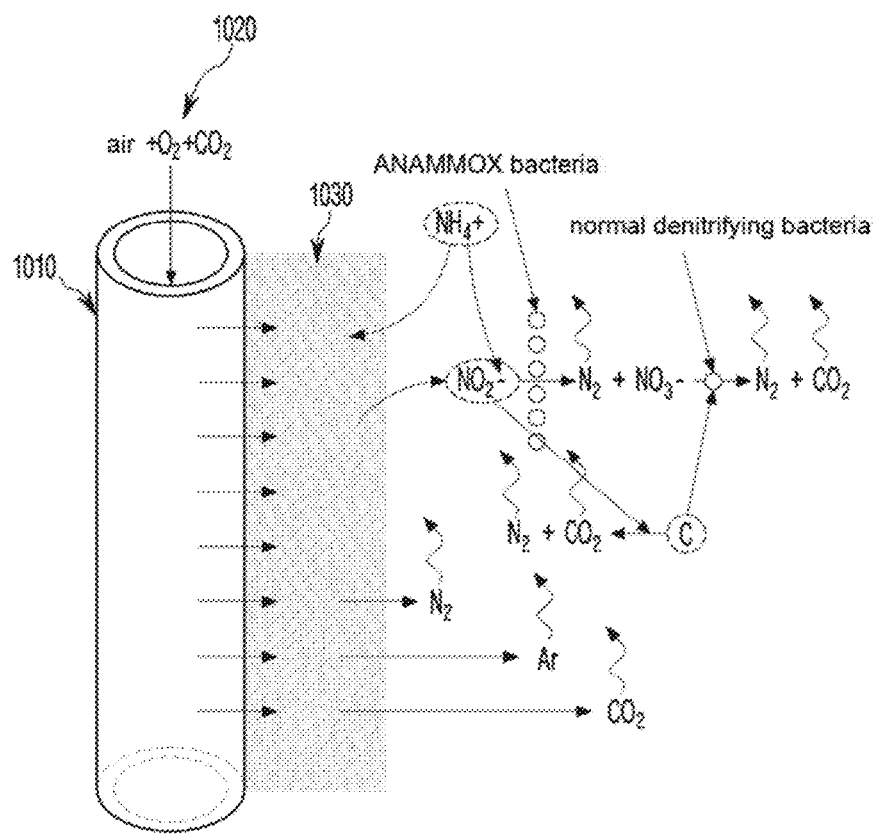
FIG. 10 is a view illustrating a process in which nitrogen is removed from wastewater in a membrane diffuser according to an embodiment of the present invention.

FIG. 10 is a view illustrating a process in which nitrogen is removed from wastewater in a membrane diffuser according to an embodiment of the present invention.

A membrane diffuser 1010 is immersed in a bio reactor 920, allowing bacteria to stick and grown on the membrane surface. In the gas 1020 needed for biological reaction and mixture, the air 120, oxygen 121, and carbon dioxide 122 are adjusted to a predetermined ratio and are supplied to the membrane diffuser 1010. The membrane diffuser 1010 may be formed of a material, e.g., fiber threads, where bacteria may easily be stuck and cultivated, but is not limited thereto. In this case, the bacteria stuck to the membrane surface include the ammonia-oxidizing bacteria (AOB) that oxidize ammonia into nitrite nitrogen and the nitrite-oxidizing bacteria (NOB) that oxidize the nitrite nitrogen into nitrate nitrogen. The membrane diffuser 1010 may supply a limited amount of oxygen 121, as much as needed to produce nitrite nitrogen, thereby restricting growth of the nitrite-oxidizing bacteria (NOB). Further, the ammonia-oxidizing bacteria (AOB) and the nitrite-oxidizing bacteria (NOB) may 100% consume the supplied oxygen 121, allowing the dissolved oxygen (DO) in the liquid state to remain zero.

The nitrite nitrogen generated by the ammonia-oxidizing bacteria (AOB) is smoothly transferred to the ANAMMOX bacteria present between the membrane diffusers 1010 by the mixing force of the gas 1020. The ANAMMOX bacteria remove nitrogen by the ANAMMOX reaction using the nitrite nitrogen produced by the ammonia-oxidizing bacteria (AOB) stuck to the membrane diffuser 1010 and the ammoniacal nitrogen present in the liquid. At this time, for the ANAMMOX reaction to smoothly proceed, nitritation that converts part of the ammoniacal nitrogen into nitrite nitrogen needs to be performed first. In other words, it is critical to inhibit the activity of the nitrite-oxidizing bacteria (NOB) by creating an environment where the ammonia-oxidizing bacteria (AOB) is dominant so that nitrite nitrogen ($NO_2$—N) is not oxidized into nitrate nitrogen ($NO_3$—N). Likewise, a device and method therefor are described below with reference to FIGS. 12 to 19.

Meanwhile, for the ammonia-oxidizing bacteria (AOB) to take dominance, the bio film 1030 created by the membrane diffuser 1010 needs to be efficiently leached and, at this time, the amount of gas 1020 needed becomes two or three times the amount of gas needed for mixture. Thus, as described above, the controller 960 of the shortcut nitrogen remover 900 supplies a flux needed for leaching by increasing the amount of carbon dioxide 122, thereby leaching the bio film and hence maintaining a proper sludge retention time (SRT).

Since the ANAMMOX bacteria has a low growth rate, the membrane diffuser may add a module filled with separate media 810, thereby allowing the ANAMMOX bacteria to stick and grow. Thus, the membrane diffuser may secure ANAMMOX bacteria at a concentration two to three times higher than in the suspended state.

The nitrate nitrogen which corresponds to 10% of the ammoniacal nitrogen removed while undergoing the shortcut nitrogen removal reaction is produced as a byproduct. The nitrate nitrogen, the byproduct of the shortcut nitrogen removal reaction, may be removed along with the organic materials present in the liquid, by the normal denitrifying bacteria in the suspended state. The conventional shortcut nitrogen removal process directly injects oxygen 121 needed for nitritation, so that all of the organic materials present in the liquid are oxidized. At this time, the carbon source used for removing the nitrate nitrogen which is the byproduct of shortcut nitrogen removal reaction is oxidized as well. Thus, the carbon source for removing nitrate nitrogen may run short, rendering it impossible to remove nitrate nitrogen by normal denitrification. For such a reason, the conventional techniques add a separate process for supplying a carbon source from the outside to remove nitrate nitrogen.

However, according to an embodiment of the present invention, the membrane diffuser 1010 supplies the oxygen 121 needed for nitritation through the membrane diffuser 1010 only to the ammonia-oxidizing bacteria (AOB) or nitrite-oxidizing bacteria (NOB) and thus 100% consumes the same. Thus, the nitrite nitrogen, together with the organic materials present in the liquid, may be removed by the normal denitrifying bacteria. Thus, according to an embodiment of the present invention, the membrane diffuser 1010 advantageously requires no separate carbon source.

FIG. 11 is a flowchart illustrating a process of shortcut nitrogen removal according to an embodiment of the present invention. What has been described in detail above with reference to FIGS. 7 to 10 is not repeatedly described below.

The shortcut nitrogen remover 900 supplies gas including air, oxygen, and carbon dioxide in a predetermined quantity (S1110).

The shortcut nitrogen remover 900 measures the flux of wastewater and the concentration of ammoniacal nitrogen (S1120).

The shortcut nitrogen remover 900 calculates the amount of oxygen needed for a biological reaction and the amount of gas needed for mixture in reactor (S1130).

The shortcut nitrogen remover 900 adjusts the amount of each component in the gas supplied, based on the calculated amount.

FIG. 12 is a view illustrating an activity inhibitor of nitrite-oxidizing bacteria (NOB) according to the first embodiment of the present invention.

A nitrite-oxidizing bacteria (NOB) activity inhibitor 1200 may be added to the shortcut nitrogen remover 900 where partial nitritation-ANAMMOX process is performed. As described above in connection with FIGS. 9 and 10, a method for effectively removing nitrogen is to prevent nitrite oxidation. However, since the nitrite-oxidizing bacteria (NOB) and ammonia-oxidizing bacteria (AOB) coexist in the membrane diffuser unit 910, the present invention may inhibit the activity of the nitrite-oxidizing bacteria (NOB) by adding the nitrite-oxidizing bacteria activity inhibitor 1200 to the shortcut nitrogen remover 900.

The nitrite-oxidizing bacteria activity inhibitor 1200 includes a leaching tank 1210 for leaching solids and bacteria attached to the surface of the membrane diffuser unit 910, an inhibition reaction tank (or inhibition tank) 1220 filled with a suppressant for inhibiting the activity of the nitrite-oxidizing bacteria (NOB), and a washing tank 1230 for washing out the suppressant remaining on the membrane surface.

The leaching tank 1220 leaches excessive bacteria and solids stuck to the membrane diffuser unit 910. The retention time for leaching varies depending on the state of the stuck bacteria and solids and, after leaching is complete, the membrane diffuser unit 910 is carried to the inhibition tank 1220.

The inhibition tank 1220 inhibits the conversion by the nitrite-oxidizing bacteria (NOB) from nitrite to nitrate nitrogen. The inhibition tank 1220 includes a suppressant for inhibiting the activity of the nitrite-oxidizing bacteria (NOB), and the time when the membrane diffuser unit 910 is immersed is varied depending on the kind and concentration of the suppressant.

The washing tank 1230 washes out the components of the suppressant that are left on the membrane diffuser unit 910 immersed in the inhibition tank 1220. In particular, the washing tank 1230 removes the residue of hydroxylamine, which is very toxic among the components of the suppressant, preventing hydroxylamine from entering the reactor, where subsequent partial nitritation-ANAMMOX process is performed, and draining out along with the effluent water.

After washing is done, the membrane diffuser unit 910 is carried to an ANAMMOX reactor (not shown) of the shortcut nitrogen remover 900 and then undergoes subsequent partial nitritation-ANAMMOX process.

A device for inhibiting the activity of nitrite-oxidizing bacteria (NOB) and a method using the same are described below in detail with reference to FIGS. 13 to 17.

FIG. 13 is a view illustrating a process in which a membrane diffuser unit is immersed in a leaching tank of a nitrite-oxidizing bacteria activity inhibitor, according to the first embodiment of the present invention.

With the air supplied to the bio reactor 920 blocked off, the membrane diffuser unit 910 installed in the bio reactor 920 is carried to the first tank, the leaching tank 1210, of the nitrite-oxidizing bacteria activity inhibitor 1200 including the three tanks 1210, 1220, and 1230. The membrane diffuser unit 910 undergoes immersion in the leaching tank 1210 while allowing excessive bacteria and solids stuck to the surface of the membrane diffuser to be removed.

The leaching tank 1210 secures a depth at which the membrane diffuser unit 910 may be completely immersed using discharged water. A diffusing device (not shown) for supplying air to secure a shear force needed for leaching and a circulation pump 1240 for forming an upward flow are installed at the leaching tank 1210.

In the leaching tank 1210, the air is supplied so that the surface velocity of air in the bio reactor 920 becomes 5 m/hr to 25 m/hr, considering the state of bacteria stuck to the immersed membrane diffuser unit 910. The nitrite-oxidizing bacteria activity inhibitor 1200 operates the circulation pump 1240 to supply circulation water so as to produce an additional shear force, thereby forming an upflow velocity in the leaching tank 1210 and hence prompting leaching. At this time, the leaching tank 1210 adjusts the circulation so that the surface upflow velocity (flux/reactor area) of the bio reactor 920 becomes 30 m/hr to 90 m/hr. The retention time of the membrane diffuser unit 910 in the leaching tank 1210 may be about 50 minutes to 60 minutes depending on the state of the attached bacteria.

If leaching of the solids is complete, the nitrite-oxidizing bacteria activity inhibitor 1200 first stops operating the circulation pump 1240 and supplies only air for 5 minutes to 10 minutes. The amount of air supplied to the leaching tank 1210 is set to gradually reduce over time and, upon reaching a preset time, become zero. Thus, the nitrite-oxidizing bacteria activity inhibitor 1200 operates the circulation pump 1240 to generate an upflow velocity in the leaching tank 1210 and to move the leached solids to the upper part of the reactor 920, and the nitrite-oxidizing bacteria activity inhibitor 1200 stops operating the circulation pump 1240 to supply only the air so that the leached solids are, without sticking again to the membrane diffuser, moved to the lower part of the leaching tank 1210 and sedimented. The membrane diffuser unit 910 is removed from the leaching tank 1210, and the solids sedimented on the bottom of the leaching tank 1210 are discharged to a primary processing facility (not shown), and additional water is supplied to the leaching tank 1210 to maintain the depth of water in the solids-discharged leaching tank 1210.

FIG. 14 is a view illustrating a process in which a membrane diffuser unit where solid leaching has been complete is immersed in an inhibition reaction tank filled with a nitrite-oxidizing bacteria (NOB) suppressant according to the first embodiment of the present invention.

The nitrite-oxidizing bacteria activity inhibitor 1200 moves the membrane diffuser unit 910, where leaching of the solids has been complete, to the inhibition tank 1220. As the suppressant filling the inhibition tank 1220, hydroxylamine, $NO_2$ and $NH_4$ may be used, but not limited thereto.

Hydroxylamine is a white, small chunk and in a needle-shaped solid or colorless liquid state, is used to remove unnecessary leather from fiber or as a germicide. Hydroxylamine is known as an effective nitrite-oxidizing bacteria (NOB) suppressant. When hydroxylamine is used as suppressant, the time during which the membrane diffuser unit 910 stays in the inhibition tank 1220 varies depending on the concentration of suppressant. Typically, the retention time in the inhibition tank 1220 is adjusted so that concentration (mg/L)×time (minutes) ranges from 50 to 200. As such, the reason for limiting the range of concentration (mg/L)×time (minutes) is that if the suppressant stays for a predetermined time or longer, the ammonia-oxidizing bacteria (AOB) may be inhibited regardless of whether the concentration of the suppressant is high or low. Since the present invention aims to suppress the nitrite-oxidizing bacteria (NOB), suppressing of the ammonia-oxidizing bacteria (AOB) results in deterioration of the overall processing efficiency. More specifically, the process according to an embodiment of the present invention may merely suppress the activity of the nitrite-oxidizing bacteria (NOB) but does not get rid of the nitrite-oxidizing bacteria (NOB). However, as the environment advantageous to the ammonia-oxidizing bacteria (AOB) remains steady, the ammonia-oxidizing bacteria (AOB) may take dominance and, thus, the time and number of times of immersion for inhibiting the nitrite-oxidizing bacteria (NOB) may reduce. At this time, if the degree of nitritation in the overall process is figured out and nitritation is stably performed, the number of times of immersion may be reduced and, if the concentration of nitrate nitrogen is increased, the number of times of immersion may be increased.

In other words, this is for creating an environment in which the activity of the nitrite-oxidizing bacteria (NOB) is suppressed, and the ammonia-oxidizing bacteria (AOB) takes dominance. The concentration of the suppressant and the time of immersion in the inhibition tank 1220 may be adjusted depending on the degree of nitritation in the overall process.

Where $NO_2$ or $NH_4$ is used as suppressant, it is material to maintain a proper pH. This is why if $NO_2$ or $NH_4$ is used as suppressant, the free nitrous acid (FNA) and free ammonia (FA) formed depending on pH and the concentration of $NO_2$ and $NH_4$ are used to inhibit the activity of the nitrite-oxidizing bacteria (NOB).

Generally, it is known that the nitrite-oxidizing bacteria (NOB) is inhibited at the FNA concentration ranging from 0.2 mg/L to 2.8 mg/L. The FNA concentration is varied depending on the pH and the concentration of $NO_2$ and, as the pH reduces and the $NO_2$ concentration increases, the concentration of FNA rises. The present invention adjusts the concentration of FNA by adjusting the pH and concentration of $NO_2$, thus allowing the immersion concentration (mg/L)×time (minutes) value to range from 24 to 50. Further, the pH is allowed to range from 4.5 to 6.0 to save the usage of suppressant. Likewise, the concentration of suppressant and the time of immersion in the inhibition tank 330 may be adjusted considering the condition of the overall process.

In the case where $NH_4$ is used, the concentration of free ammonia (FA) is varied depending on the pH and the concentration of $NH_4$. It is known that at the FA concentration ranging from 0.1 mg/L to 1.0 mg/L, the nitrite-oxidizing bacteria (NOB) is inhibited. The present invention may vary the FA concentration by adjusting the pH and $NH_4$ concentration and may adjust the FA concentration (mg/L)×retention time (minutes) to range from 2.5 to 25. Since the FA is formed well at high pH, the present invention adjusts the pH to range from 7.5 to 9.0, thereby saving chemical usage.

As the suppressant used in the inhibition tank 1220, NO gas, as well as liquid hydroxylamine, $NO_2$ and $NH_4$, may be used. An embodiment of a nitrite-oxidizing bacteria activity inhibitor using NO as suppressant is described below with reference to FIGS. 16 and 17.

FIG. 15 is a view illustrating a process in which a membrane diffuser unit where suppression reaction has been complete is moved to and immersed in a washing tank according to the first embodiment of the present invention.

The membrane diffuser unit 910 where the suppressing reaction has been complete is moved to the washing tank 1230, and the chemical residues on the surface of the membrane diffuser are removed in the washing tank 1230. Washing may be performed using the discharged water from the treatment facility for five minutes or less. However, the washing time may be adjusted depending on the state of adsorption of the remaining suppressant or the operation time of the overall process.

Figure 16:
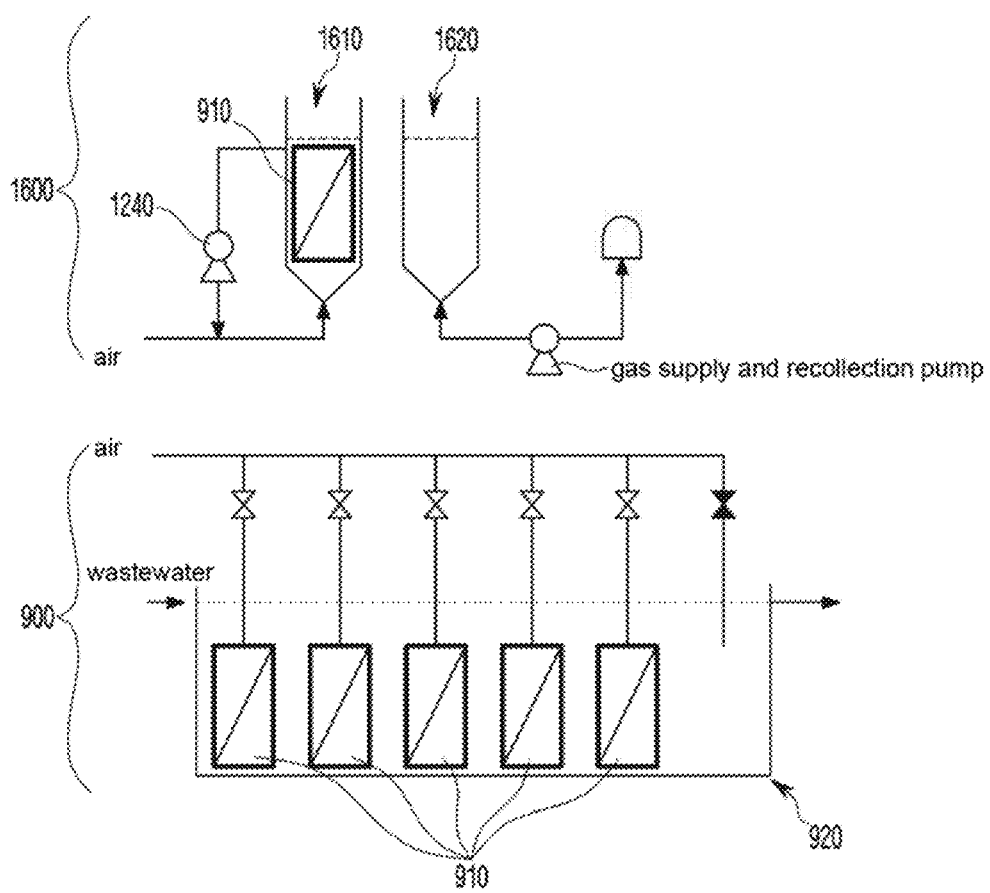
FIG. 16 is a view illustrating a process in which a membrane diffuser unit is immersed in a leaching tank when NO gas is used as suppressant according to the second embodiment of the present invention.

FIG. 16 is a view illustrating a process in which a membrane diffuser unit is immersed in a leaching tank when NO gas is used as suppressant according to the second embodiment of the present invention.

As set forth above, NO gas, as well as hydroxylamine, $NO_2$ and $NH_4$ may be used as suppressant. NO exists as colorless gas at the room temperature and has a melting point of −161° C. and a boiling point of −151° C. Since NO in the gas state has a density of 1.34 g/cm³ which is large as compared with the density of air, 0.0012 g/cm³, although NO gas is injected into the inhibition tank 1620 and used, discharge to the outside of the tank is minimized. In the nitrite-oxidizing bacteria activity inhibitor 1600 that uses NO gas as suppressant, the membrane diffuser unit 910 is removed from the bio tank 920 and is carried to the leaching tank 1610. The operation conditions for the leaching tank 1610 is the same as those described above and are thus not repeatedly described.

FIG. 17 is a view illustrating a process in which a membrane diffuser unit is immersed in an inhibition reaction tank when NO gas is used as suppressant according to the second embodiment of the present invention.

The membrane diffuser unit 910 where leaching of solids has been complete is carried to the NO-filled inhibition tank 1620 and, in the inhibition tank 1620, such a reaction is performed as to suppress the activity of nitrite-oxidizing bacteria (NOB) in the membrane diffuser unit 910. The NO concentration in the inhibition tank 1620 influences not only the ammonia-oxidizing bacteria (AOB) but also the nitrite-oxidizing bacteria (NOB) and, thus, needs to remain at a proper level. The amount dissolved in the membrane diffuser may range from about 2 μg/L to about 5 μg/L, and the NO concentration may range from about 4 mg/L to about 10 mg/L but, without limitation thereto, the concentration may be left to be able to effectively suppress the nitrite-oxidizing bacteria (NOB).

Figure 18:
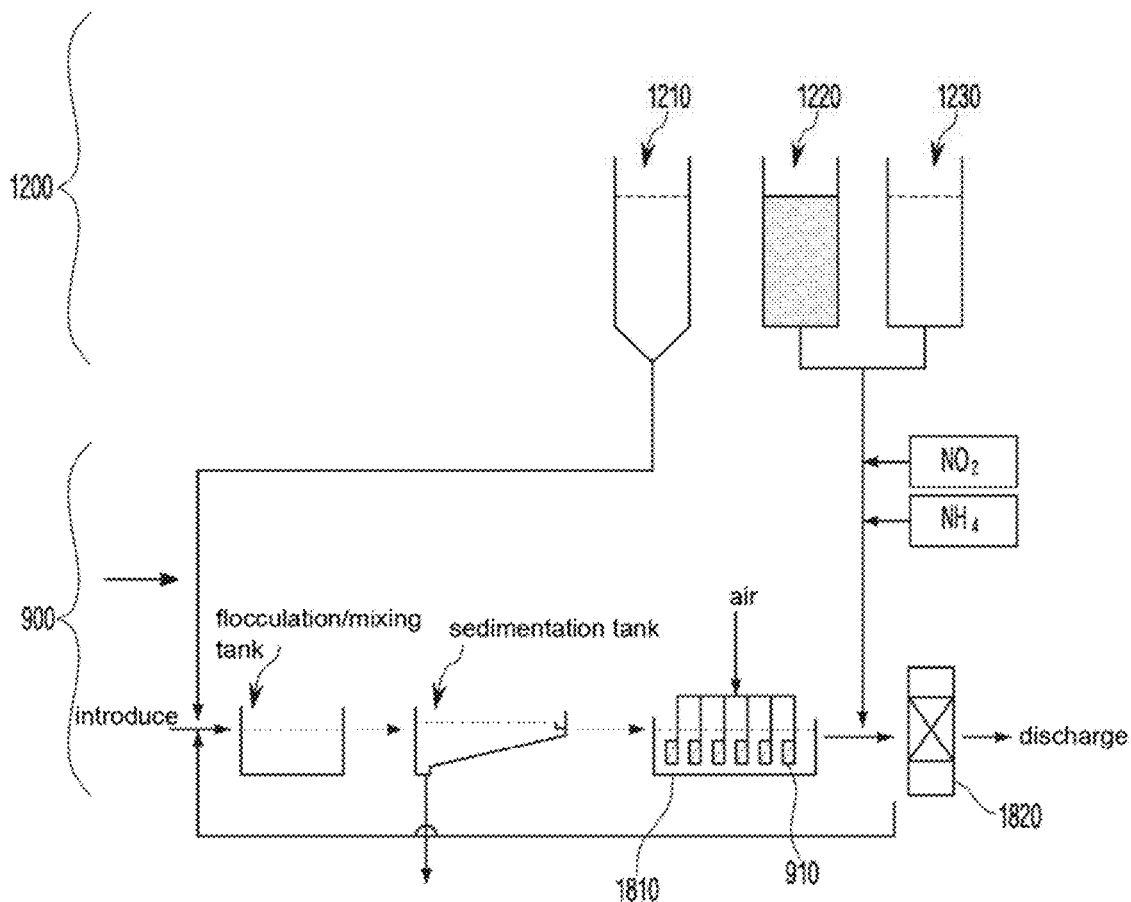
FIG. 18 is a view illustrating a process in which a suppressant of nitrite-oxidizing bacteria (NOB) is reused and injected in a partial nitritation-ANAMMOX process according to an embodiment of the present invention.

FIG. 18 is a view illustrating a process in which a suppressant of nitrite-oxidizing bacteria (NOB) is reused and injected in a partial nitritation-ANAMMOX process according to an embodiment of the present invention.

$NO_2$ and $NH_4$ which are used as suppressant in the inhibition tank 1220 may be lowered in purity and functionality over time. To prevent this, chemicals may be put to maintain the concentration and it may thereby be reused as suppressant. However, in the nitrite-oxidizing bacteria activity inhibitor 1200 of the present invention, $NO_2$ and $NH_4$, which are lowered in concentration and thus are unavailable as suppressant, are put in the partial nitritation-ANAMMOX process, thereby saving processing costs.

More specifically, in the partial nitritation-ANAMMOX process, the $NO_2$—N: $NH_4$—N ratio in the sewage introduced into the ANAMMOX process is maintained to be 1.32:1.0. Thus, in the partial nitritation-ANAMMOX process, part of nitrogen introduced to the partial nitritation tank 1810 upstream of the ANAMMOX tank 1820 is oxidized to allow the $NO_2$—N:$NH_4$—N ratio to be adjusted to be 1.32:1.0. To that end, in the partial nitritation-ANAMMOX process, a chemical for adjusting the $NO_2$—N, $NH_4$—N ratio is injected to a separate reactor (not shown) so that the $NO_2$—N:$NH_4$—N ratio is 1.32:1.0. At this time, as shown in FIG. 18, the nitrite-oxidizing bacteria activity inhibitor 1200 purifies the $NO_2$ and $NH_4$ used in the inhibition tank 1220 and injects the purified $NO_2$ and $NH_4$ to the ANAMMOX reactor 1820 to adjust the $NO_2$—N:$NH_4$—N ratio.

Figure 19:
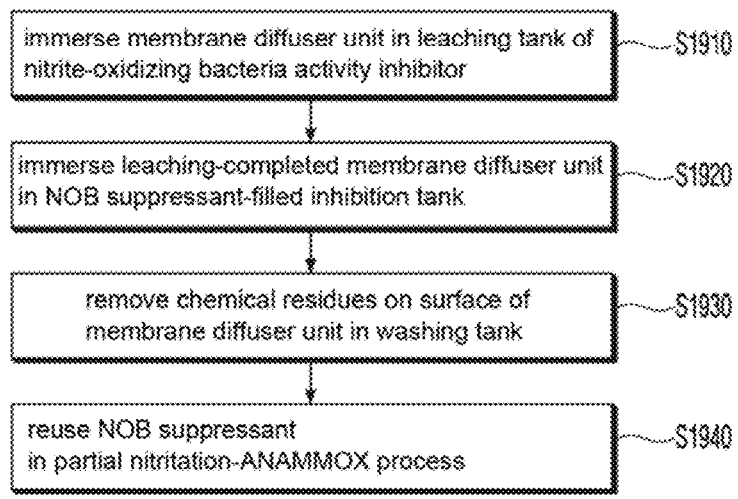
FIG. 19 is a flowchart illustrating a method of suppressing nitrite oxidation by a nitrite-oxidizing bacteria (NOB) activity inhibitor according to an embodiment of the present invention.

FIG. 19 is a flowchart illustrating a method of suppressing nitrite oxidation by a nitrite-oxidizing bacteria (NOB) activity inhibitor according to an embodiment of the present invention. What has been described in detail above with reference to FIGS. 12 to 18 is not repeatedly described below.

The nitrite-oxidizing bacteria activity inhibitor 1200 immerses the membrane diffuser unit 910 in the leaching tank 1210 to leach bacteria and solids excessively building up on the membrane diffuser unit 910 (S1910).

The nitrite-oxidizing bacteria activity inhibitor 1200 immerses the membrane diffuser unit 910, where leaching of the solids has been complete, to the suppressant-filled inhibition tank 1220 so as to suppress nitrite oxidation (S1920).

Where the suppressant used in the inhibition tank 1220 is hydroxylamine), $NO_2$ and $NH_4$, the nitrite-oxidizing bacteria activity inhibitor 1200 moves the membrane diffuser unit 910 to the washing tank 1230 to remove the chemical residues on the surface of the membrane diffuser unit 910 (S1930). At this time, a different process may be applied depending on the kind of suppressant used in the inhibition tank 1220. If the used suppressant is neither solid nor liquid, e.g., if NO gas is used as suppressant, the washing process may be omitted.

If the nitrite-oxidizing bacteria activity inhibitor 1200 uses $NO_2$ and $NH_4$ as suppressant, they may be reused and injected to the partial nitritation-ANAMMOX process (S1940).

Although FIGS. 11 and 19 illustrate that the steps are sequentially performed, this merely provides an embodiment of the disclosure. It would readily be appreciated by a skilled artisan that the steps of FIGS. 11 and 19 are not limited to the order shown but may rather be performed in a different order, one or more of the steps may simultaneously be performed, or other various modifications or changes may be made thereto without departing from the scope of the disclosure The steps or processes described above in connection with FIGS. 11 and 19 may be implemented as computer-readable code in a recording medium. The computer-readable recording medium includes all types of recording devices storing data readable by a computer system. The computer-readable recording medium includes a storage medium, such as a magnetic storage medium (e.g., a ROM, a floppy disk, or a hard disk), an optical reading medium (e.g., a CD-ROM or a DVD), or a carrier wave (e.g., transmission over the Internet). Further, the computer-readable recording medium may be distributed to computer systems connected via a network, and computer-readable codes may be stored and executed in a distributed manner.

The above-described embodiments are merely examples, and it will be appreciated by one of ordinary skill in the art various changes may be made thereto without departing from the scope of the present invention. Accordingly, the embodiments set forth herein are provided for illustrative purposes, but not to limit the scope of the present invention, and should be appreciated that the scope of the present invention is not limited by the embodiments. The scope of the present invention should be construed by the following claims, and all technical spirits within equivalents thereof should be interpreted to belong to the scope of the present invention.

CROSS-REFERENCE TO RELATED APPLICATION

The instant patent application claims priority under 35 U.S.C. 119(a) to Korean Patent Application Nos. 10-2017-0128467 and 10-2018-0042446, filed on Sep. 30, 2017 and Apr. 12, 2018, respectively, in the Korean Intellectual Property Office, the disclosures of which are herein incorporated by reference in their entireties. The present patent application claims priority to other applications to be filed in other countries, the disclosures of which are also incorporated by reference herein in their entireties.

The invention claimed is:

1. A hollow fiber diffuser module for shortcut nitrogen removal using nitrite bacteria and anaerobic ammonium oxidation (ANAMMOX) bacteria, the hollow fiber diffuser module positioned in a reactor, the hollow diffuser module comprising: at least one or more hollow fiber diffusers, wherein
   the at least one or more hollow fiber diffusers includes a plurality of hollow fiber threads where bacteria may stick and grow and an inlet part for supplying gas on a side of the plurality of hollow fiber threads, wherein
   the at least one or more hollow fiber diffusers are spaced apart from each other in a predetermined gap including media including the ANNAMOX bacteria, wherein
   the gas includes air, oxygen, and carbon dioxide, wherein an amount of the supplied gas is adjusted to be identical to a sum of an amount needed for supply of oxygen and an amount needed for mixture in the reactor, wherein it is determined whether the amount of the supplied gas except for an amount of oxygen needed for biological reaction is sufficient for mixture in the reactor to thereby reduce the amount of the supplied gas or further inject carbon dioxide, and wherein when the amount of oxygen included in the supplied gas is insufficient for the amount of oxygen needed for biological reaction, more oxygen is injected.

2. The hollow fiber diffuser module of claim 1, wherein the hollow fiber diffuser module is positioned in the reactor for a shortcut nitrogen removal process, and wherein the supplied gas includes a mixture of oxygen necessary for the shortcut nitrogen removal process and a gas necessary for mixture in the reactor.

3. A shortcut nitrogen remover for shortcut nitrogen removal using nitrite bacteria and ANAMMOX bacteria, comprising:
   a measuring unit measuring, at least, a flux of wastewater introduced and a concentration of ammonium nitrogen;
   a reactor removing nitrogen from the introduced wastewater;
   a plurality of hollow fiber diffuser modules positioned in the reactor, the plurality of hollow fiber diffuser modules including at least one or more hollow fiber diffusers spaced apart from each other in a predetermined gap including the ANNAMOX bacteria;
   an air supplier supplying gas to the plurality of hollow fiber diffuser modules,
   the gas including air, oxygen, and carbon dioxide; and a controller controlling of the supply of the gas, wherein the shortcut nitrogen remover adjusts an amount of the supplied gas to be identical to a sum of an amount needed for supply of oxygen and an amount needed for mixture in the reactor, wherein the shortcut nitrogen remover determines whether the amount of the supplied gas except for an amount of oxygen needed for biological reaction is sufficient for mixture in the reactor to thereby reduce the amount of the supplied gas or further inject carbon dioxide, and wherein when the amount of oxygen included in the supplied gas is insufficient for the amount of oxygen needed for biological reaction, the shortcut nitrogen remover injects more oxygen.

4. The shortcut nitrogen remover of claim 3, wherein the fiber diffuser modules include a plurality of fiber diffusers where nitrite bacteria producing nitrous acid stick and grow and ANAMMOX bacteria positioned in predetermined spaces between the plurality of fiber diffusers.

5. The shortcut nitrogen remover of claim 4, further comprising:
media positioned in the predetermined spaces, wherein the media include the ANAMMOX bacteria.

6. The shortcut nitrogen remover of claim 4, wherein a volume of the gas including the oxygen and the carbon dioxide is controlled to be identical to a volume of gas needed for mixture in the reactor.

7. A method for shortcut nitrogen removal, the method comprising:

supplying a gas including air, oxygen, and carbon dioxide to a plurality of fiber diffusers; measuring, at least, a flux of wastewater and a concentration of ammoniacal nitrogen; calculating an amount of the gas needed for biological reaction and an amount of the gas needed for mixture in a reactor;

adjusting the amount of the gas based on the calculated amount, to be identical to a sum of the amount needed for biological reaction and the amount needed for mixture in the reactor;

determining whether the amount of the supplied gas except for an amount of oxygen needed for the biological reaction is sufficient for mixture in the reactor to thereby reduce the amount of the supplied gas or further inject carbon dioxide; and when the amount of oxygen included in the supplied gas is insufficient for the amount of oxygen needed for biological reaction, injecting more oxygen.

* * * * *